United States Patent
Li et al.

(10) Patent No.: US 10,986,474 B2
(45) Date of Patent: Apr. 20, 2021

(54) METHODS OF ENABLING FLEXIBLE CHARGING IN M2M IOT SERVICE LAYER

(71) Applicant: CONVIDA WIRELESS, LLC, Wilmington, DE (US)

(72) Inventors: Hongkun Li, Malvern, PA (US); Michael F. Starsinic, Newtown, PA (US); Dale N. Seed, Allentown, PA (US); Nicholas Podias, Brooklyn, NY (US); Catalina Mihaela Mladin, Hatboro, PA (US); Gregory S. Sternberg, Mt. Laurel, NJ (US); Rocco Di Girolamo, Laval (CA)

(73) Assignee: Convida Wireless LLC, Wilmington, DE (US)

( * ) Notice: Subject to any disclaimer, the term of this patent is extended or adjusted under 35 U.S.C. 154(b) by 0 days.

(21) Appl. No.: 16/349,690

(22) PCT Filed: Nov. 14, 2017

(86) PCT No.: PCT/US2017/061468
§ 371 (c)(1),
(2) Date: May 14, 2019

(87) PCT Pub. No.: WO2018/089977
PCT Pub. Date: May 17, 2018

(65) Prior Publication Data
US 2019/0281426 A1    Sep. 12, 2019

Related U.S. Application Data

(60) Provisional application No. 62/421,715, filed on Nov. 14, 2016.

(51) Int. Cl.
*H04W 4/24* (2018.01)
*H04W 4/70* (2018.01)
(Continued)

(52) U.S. Cl.
CPC .............. *H04W 4/24* (2013.01); *H04L 12/14* (2013.01); *H04M 15/64* (2013.01); *H04W 4/70* (2018.02)

(58) Field of Classification Search
CPC .......... H04W 4/24; H04W 4/70; H04L 12/14; H04M 15/64
See application file for complete search history.

(56) References Cited

U.S. PATENT DOCUMENTS

2011/0003579 A1    1/2011  Cai et al.
2012/0184244 A1*   7/2012  Cai ........................ H04L 12/14
                                                         455/408
(Continued)

OTHER PUBLICATIONS

3GPP TS 23.203 V12.0.0 "3rd Generation Partnership Project; Technical Specification Group Services and System Aspects; Policy and charging control architecture (Release 12)", Mar. 2013, 183 pages.

(Continued)

*Primary Examiner* — Barry W Taylor
(74) *Attorney, Agent, or Firm* — BakerHostetler

(57) ABSTRACT

The present application is at least directed to an apparatus on a network. The apparatus includes a non-transitory memory having instructions stored thereon for online charging of an event. The apparatus also includes a processor that is operably coupled to the non-transitory memory. The processor is configured to execute the instructions of receiving, from an M2M gateway, a rating request message for service layer online charging. The processor is also configured to execute the instructions of determining a rating scheme to charge for the event. The processor is further configured to execute the instructions of calculating an amount of service units based on the rating request message and determined rating scheme. The processor is even further configured to execute the
(Continued)

instructions of sending, to the M2M gateway, a rating response based upon the calculated amount of service units.

20 Claims, 25 Drawing Sheets

(51) Int. Cl.
*H04L 12/14* (2006.01)
*H04M 15/00* (2006.01)

(56) References Cited

U.S. PATENT DOCUMENTS

| | | | | | |
|---|---|---|---|---|---|
| 2014/0348030 | A1* | 11/2014 | Tornkvist | | H04M 15/785 |
| | | | | | 370/259 |
| 2015/0016307 | A1* | 1/2015 | Liu | | H04L 12/1485 |
| | | | | | 370/259 |
| 2015/0023219 | A1* | 1/2015 | Jin | | H04L 12/1403 |
| | | | | | 370/259 |
| 2015/0029894 | A1 | 1/2015 | Lu et al. | | |
| 2015/0326738 | A1* | 11/2015 | Li | | H04L 12/1403 |
| | | | | | 455/406 |
| 2015/0350348 | A1* | 12/2015 | Yin | | H04W 4/70 |
| | | | | | 709/202 |
| 2016/0080498 | A1 | 3/2016 | Lu | | |
| 2019/0349269 | A1* | 11/2019 | Li | | H04M 15/785 |
| 2020/0326989 | A1* | 10/2020 | Li | | H04L 67/12 |

OTHER PUBLICATIONS

3GPP TS 23.682 V11.3.0, "3rd Generation Partnership Project; Technical Specification Group Services and System Aspects; Architecture enhancements to facilitate communications with packet data networks and applications (Release 11)", Dec. 2012, 29 pages.

3GPP TS 29.214 V11.7.0, "3rd Generation Partnership Project; Technical Specification Group Core Network and Terminals; Policy and Charging Control over Rx reference point (Release11)", Dec. 2012, 53 pages.

3GPP TS 32.240 V12.0.0, "3rd Generation Partnership Project; Technical Specification Group Services and System Aspects; Telecommunication management; Charging management; Charging architecture and principles (Release 12)", Mar. 2013, 45 pages.

OASIS MQTT Version 3.1.1, "Committee Specification 01", May 18, 2014, 81 pages.

OASIS, "OASIS Advanced Message Queuing Protocol (AMQP) Version 1.0", Oasis Standard, Oct. 29, 2012, 125 pages.

oneM2M Technical Specification TS-0001 V23.0, "Functional Architecture", Aug. 7, 2015, 352 pages.

oneM2M Technical Specification TS-0004-V1.0.1, "Service Layer Core Protocol Specification", Jan. 30, 2015, 217 pages.

* cited by examiner

METHODS OF ENABLING FLEXIBLE CHARGING IN M2M IOT SERVICE LAYER

CROSS-REFERENCE TO RELATED APPLICATIONS

This application is the National Stage Application of International Patent Application No. PCT/US2017/061468 filed Nov. 14, 2017 which claims the benefit of priority of U.S. Provisional Application No. 62/421,715 filed Nov. 14, 2016, entitled "Methods of Enabling Flexible Charging in M2M IoT Service Layer," the contents of which is incorporated by reference in its entirety.

BACKGROUND

Charging Data Records (CDRs) are created by a transport network or service layer, sent to a "billing system", and are often used to generate bills. However, CDRs are used for more than billing and charging.

A CDR is a record that captures some event that occurred in the network or service layer. Very often, the event is an event that could impact a customer's bill. For example, an event could be that a device downloaded 10 Mega Bytes. However, the event could be the device was turned on, moved to another connection point, etc. These events rarely have impact on a customer's bill, yet CDRs are still generated.

Some events could involve several network nodes, or functions, and each function may generate a separate CDR for each event. This does not mean that the customer would be charged multiple times for one event, it simply means that multiple nodes will generate a record for the event.

Redundant CDRs and CDRs that record unbillable events are considered useful. Specifically, they are used by network operators and service providers to debug their system and analyze customers' activity. They are also used by network operators and service providers to settle accounts with other network operators and service providers when their customers are roaming or using the services of other providers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

An aspect of the application is directed to an apparatus on a network. The apparatus includes a non-transitory memory having instructions stored thereon for online charging of an event. The apparatus also includes a processor that is operably coupled to the non-transitory memory. The processor is configured to execute the instructions of receiving, from an M2M gateway, a rating request message for service layer online charging. The processor is also configured to execute the instructions of determining a rating scheme to charge for the event. The processor is further configured to execute the instructions of calculating an amount of service units based on the rating request message and determined rating scheme. The processor is even further configured to execute the instructions of sending, to the M2M gateway, a rating response based upon the calculated amount of service units.

Another aspect of the application is directed to an apparatus operating on a network. The apparatus includes a non-transitory memory having instructions stored thereon for configuring rating information. The apparatus also includes a processor, operably coupled to the non-transitory memory. The processor is configured to execute the instructions of receiving, from an originator, a configure rating request message including rating information. The processor is also configured to execute the instructions of storing, at a M2M server, the rating information received from the originator. The processor is further configured to execute the instructions of configuring, at a service domain charging trigger function in the M2M server, the rating information. The processor is even further configured to execute the instructions of sending, from the M2M server, a response including the configured rating information to the originator.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
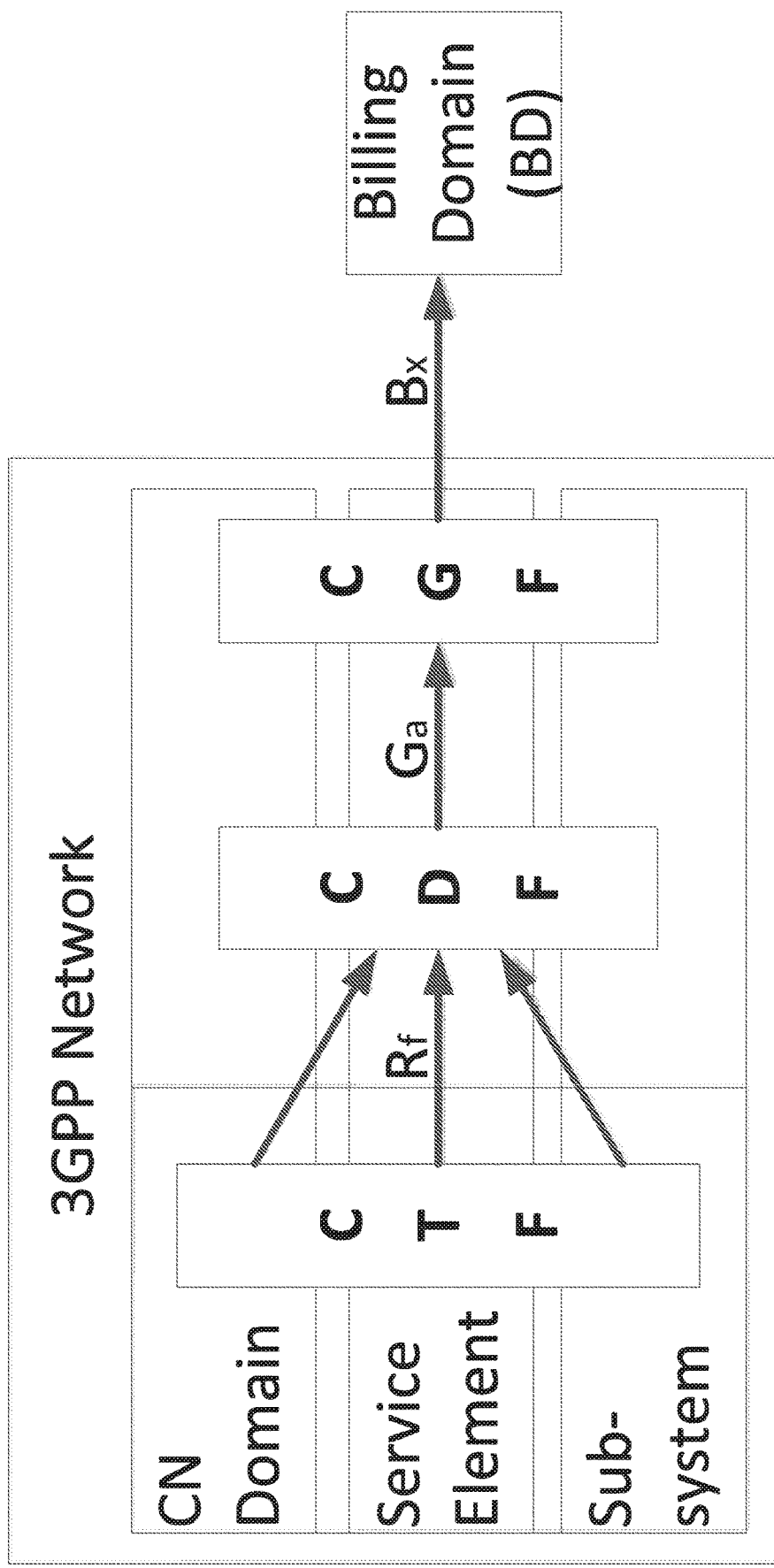
FIG. 1 is a diagram that illustrates a logical offline charging architecture.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the application is directed to methods and systems for enabling flexible charging in M2M IoT service layers. In an embodiment, a flow-based model is applied for charging by the traditional transport network, i.e., amount of data or amount of data per time unit, to charge the devices associated with the network. Today, network operators employ sophisticated charging mechanisms using some context information, such as for example, charges based on content provider, peak time versus non-peak time, and the type of access network. However, this context information is mainly device level or conventional context information. There is not much application level information used. It is not easy for transport network entity to access the application information or the service context, and to interpret the application level information. In other words, the network entity in the transport network may not be able to differentiate the content of a service flow, e.g., whether the data being retrieved is about the medical information or weather report. On the other hand, charging at service layer could be more flexible, since the entity in the service layer is capable of interpreting the application information and service context. Even for the same service, different charging schemes may be applied by different entities using different charging methods, charging rates, and charging measurement metrics.

In another embodiment, methods are systems are directed to a flexible charging service at the service layer. Different entities (e.g., service provider) can apply different charging methods (i.e., offline or online), charging models (e.g., subscription based, transaction based), charging rates, and charging measurements (e.g., time, volume) on applications for using the same service. Certain types of application and service context are defined and used to enable such capability. Both offline and online charging are supported.

Acronyms and Definitions

The following acronyms are used for commonly used terms and phrases in the application.
AMBF Account and Balance Management Function
ADN Application Dedicated Node
AF Application Function
API Application Programmable Interface
ASN Application Service Node
BD Billing Domain
CDR Charging Data Record
CDF Charging Data Function
CGF Charging Gateway Function
CTF Charging Trigger Function
CSE Common Service Entity
CSF Common Service Function
EPC Evolved Packet Core
GDI Generic Database Interface
IE Information Element
IMS IP Multimedia Subsystem
MN Middle Node
NSSE Network Service Exposure, Service Execution and Triggering
OCS Online Charging System
OFCS Offline Charging System
OMB Open Message Bus
PCC Policy and Charging Control
PCEF Policy and Charging Enforcement Function
PCRF Policy and Charging Rules Function
PDN Packet Data Networks
RF Rating Function
ROA Resource Oriented Architecture
SC Service Capability
SCA Service Charging and Accounting
SCEF Service Capability Exposure Function
SD-CDR Service Domain Charging Data Record
SD-CTF Service Domain Charging Trigger Function
SD-CS Service Domain Charging System
SD-OFCS Service Domain Offline Charging System
SD-OCS Service Domain Online Charging System
SD-RF Service Domain Rating Function
SD-ABMF Service Domain Account and Balance Management Function The following definitions are provided for terms used in the application.

| | |
|---|---|
| Charging Event | A charging event can be any activity a service provider may want to charge for, which utilizes the resources and related M2M services offered by such provider. |
| Charging Service Capability | The Charging Service Capability can be any charging service supported by a service layer |

Offline Charging Function

FIG. 1 illustrates a logical offline charging architecture. Offline charging is a process where charging information for network resource usage is collected concurrently with that resource usage. The charging information is passed through a chain of logical charging functions. At the end of this process, CDR files are generated by the network, which are then transferred to the network operator's Billing Domain (BD) for the purpose of subscriber billing and/or inter-operator accounting (or additional functions, e.g., statistics, at the operator's discretion). The BD typically comprises post-processing systems such as the operator's billing system or billing mediation device. Offline charging is a mechanism where charging information does not affect, in real-time, the service rendered.

Online Charging Function

Figure 2:
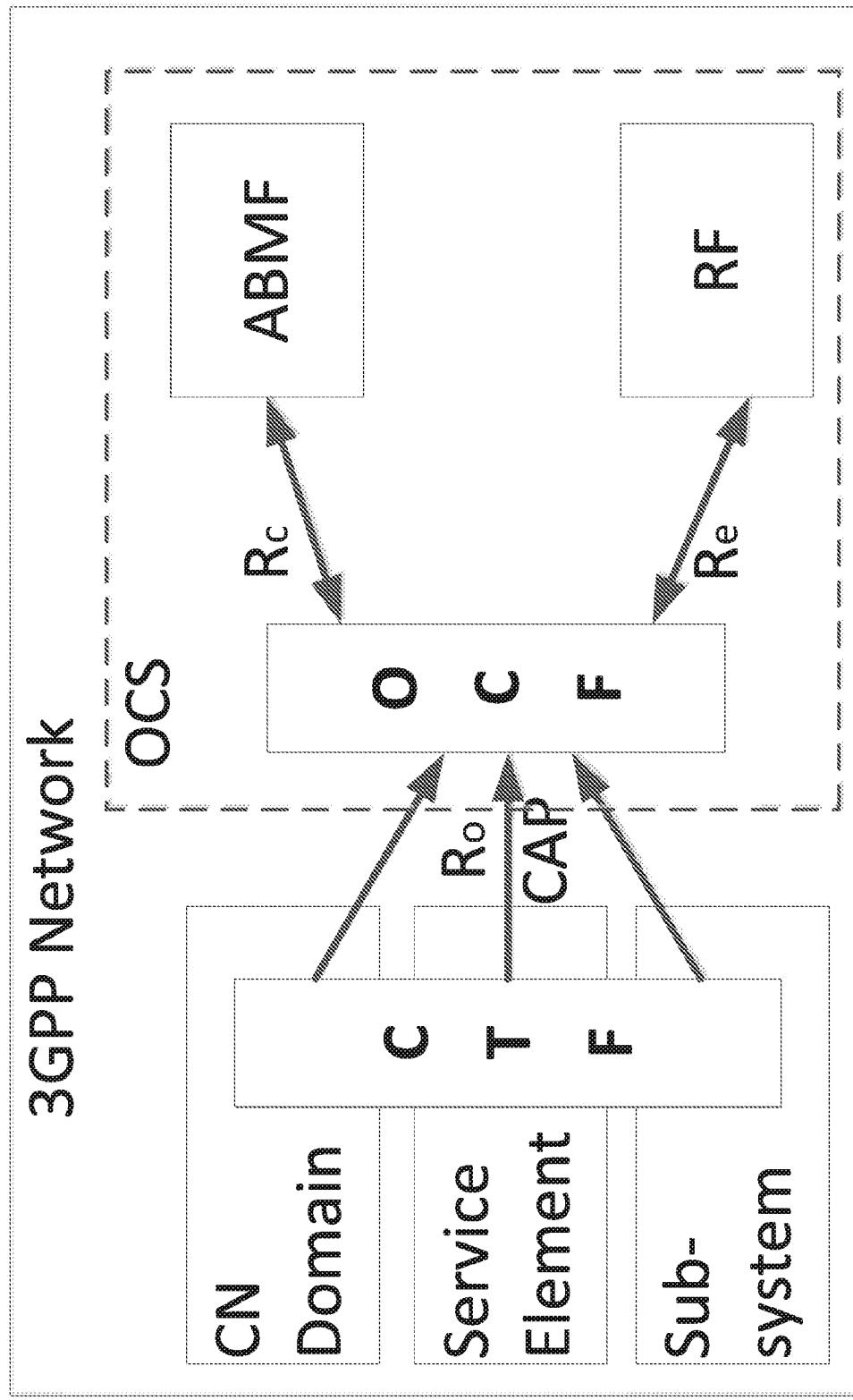
FIG. 2 is a diagram that illustrates a logical online charging architecture.

FIG. 2 illustrates a logical online charging architecture. Online charging is a process where charging information for network resource usage is concurrently collected with the resource usage in the same fashion as in offline charging. However, authorization for the network resource usage must be obtained by the network prior to the actual resource usage to occur. This authorization is granted by the Online Charging System (OCS) upon request from the network.

When receiving a network resource usage request, the network assembles the relevant charging information and generates a charging event towards the OCS in real-time. The OCS then returns an appropriate resource usage authorization. The resource usage authorization may be limited in its scope (e.g., volume of data or duration). Therefore, the authorization may have to be renewed from time to time as long as the user's network resource usage persists.

Online charging is a mechanism where charging information can affect the service rendered in real-time. Therefore, a direct interaction of the charging mechanism with the control of network resource usage is required.

In general, the flow-based charging model is used in 3GPP, i.e., the network resource usage is identified per service flow and charging granularity could be based on data size, data speed, etc. This is because the application information or the service context is transparent at the 3GPP network, which is mainly a transport network. The network entity is not able to differentiate the content of the data flow, e.g., whether the data bit is for a video flow or a text file, or whether the data is for medical report or weather report.

Recently, 3GPP defined the sponsor data connectivity to involve some application level information. One possible scenario of charging with the sponsor data connectivity is that application service provider charges the users. The application service provider would pay for usage of the 3GPP network resource used by the users.

IMS Charging Architecture

Figure 3:
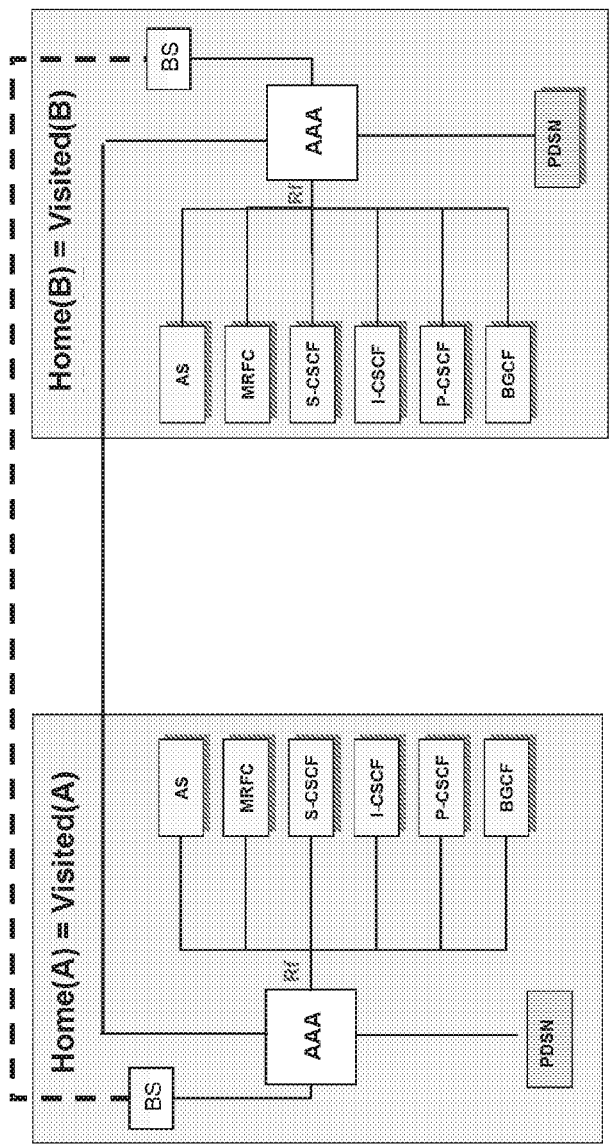
FIG. 3 is a diagram that illustrates an off-line IMS charging architecture for non-roaming scenario.

FIG. 3 illustrates an off-line IMS charging architecture for non-roaming scenario. The IMS (IP Multimedia Subsystem) network uses architecture defined by 3GPP, and uses the charging infrastructure and reference points defined by 3GPP as well. Generally, IMS charging is charging with one type of service/application, i.e., the IMS network as a SCS/AS. There are some context information, such as session information and transport charging IDs. The information is based on current diameter messages defined by 3GPP. FIG. 3 shows the offline charging architecture of IMS network without roaming, where PDSN is Packet Data Serving Node and CSCF is Call Session Control Function.

Service Layer

Figure 4:
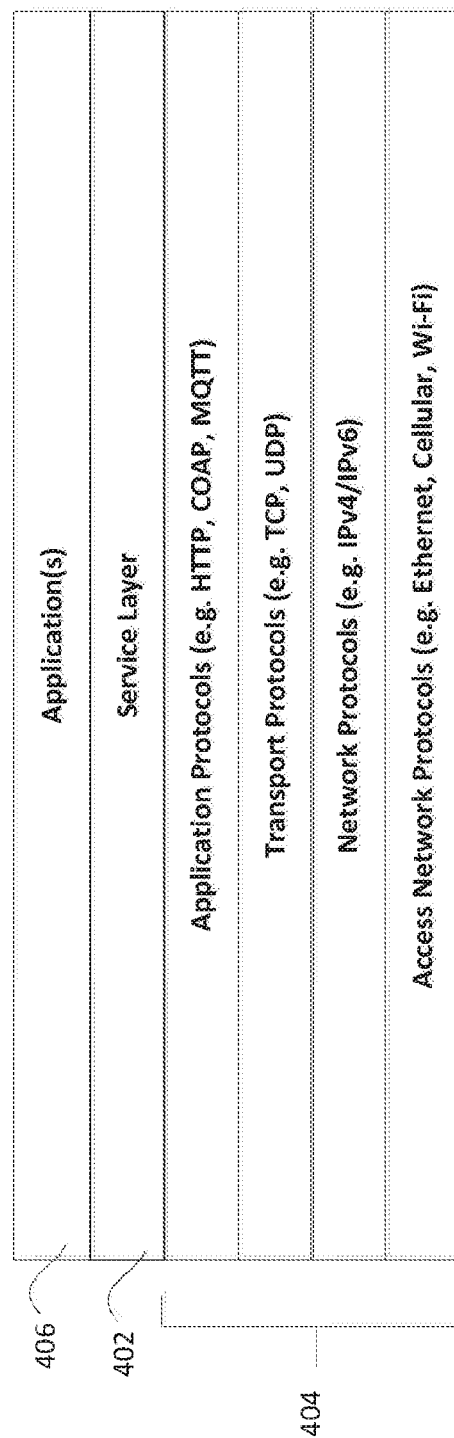
FIG. 4 is a diagram that illustrates an exemplary protocol stack supporting a service layer.

From a protocol stack perspective, service layers are typically situated above the application protocol layer and provide value added services to client applications. Hence service layers are often categorized as 'middleware' services. For example, FIG. 4 depicts an exemplary service layer 402 between an IP network stack 404 and applications 406.

An M2M/IoT service layer 402 is an example of one type of service layer specifically targeted towards providing value-added services for M2M/IoT type devices and applications. Recently, several industry standards bodies (e.g., oneM2M [eM2M-TS-0001 oneM2M Functional Architecture—V2.5.0]) have been developing M2M/IoT service layers to address the challenges associated with the integration of M2M/IoT types of devices and applications into deployments such as the Internet/Web, cellular, enterprise, and home network.

An M2M service layer 402 can provide applications and devices access to a collection of M2M-oriented capabilities supported by the service layer. A few examples include security, charging, data management, device management, discovery, provisioning, and connectivity management. These capabilities are made available to applications via APIs which make use of message formats, resource structures and resource representations defined by the M2M service layer 402.

OneM2M Service Layer Architecture

OneM2M is a new standard to develop technical specifications, which address the need for a common M2M Service Layer that can be readily embedded within various hardware and software, and relied upon to connect a wide variety of devices in the field with M2M application servers worldwide.

Figure 5:
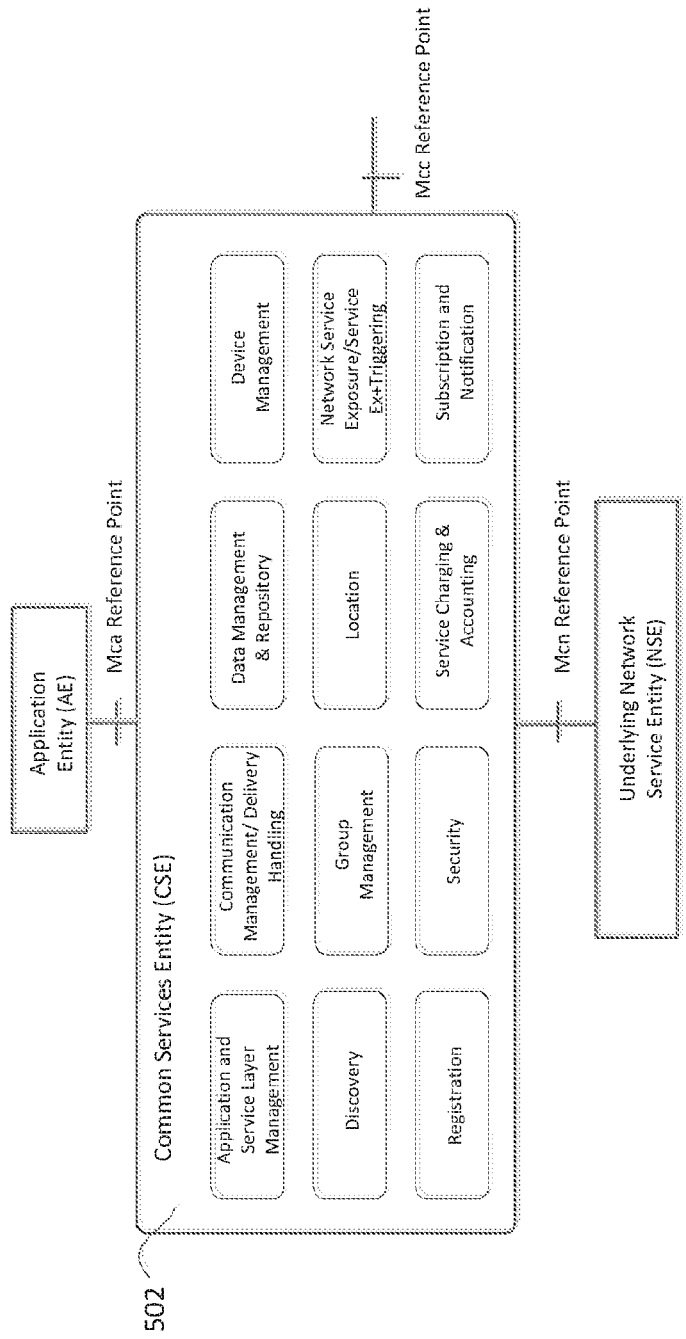
FIG. 5 is a diagram that illustrates a common service entity (CSE) and common service functions (CSF).

The oneM2M common services layer supports a set of Common Service Functions (CSFs) (i.e., service capabilities), as shown in FIG. 5. An instantiation of a set of one or more particular types of CSFs is referred to as a Common Services Entity (CSE) 502 and can be hosted on different types of network nodes (e.g., infrastructure node, middle node, application-specific node).

Figure 6:
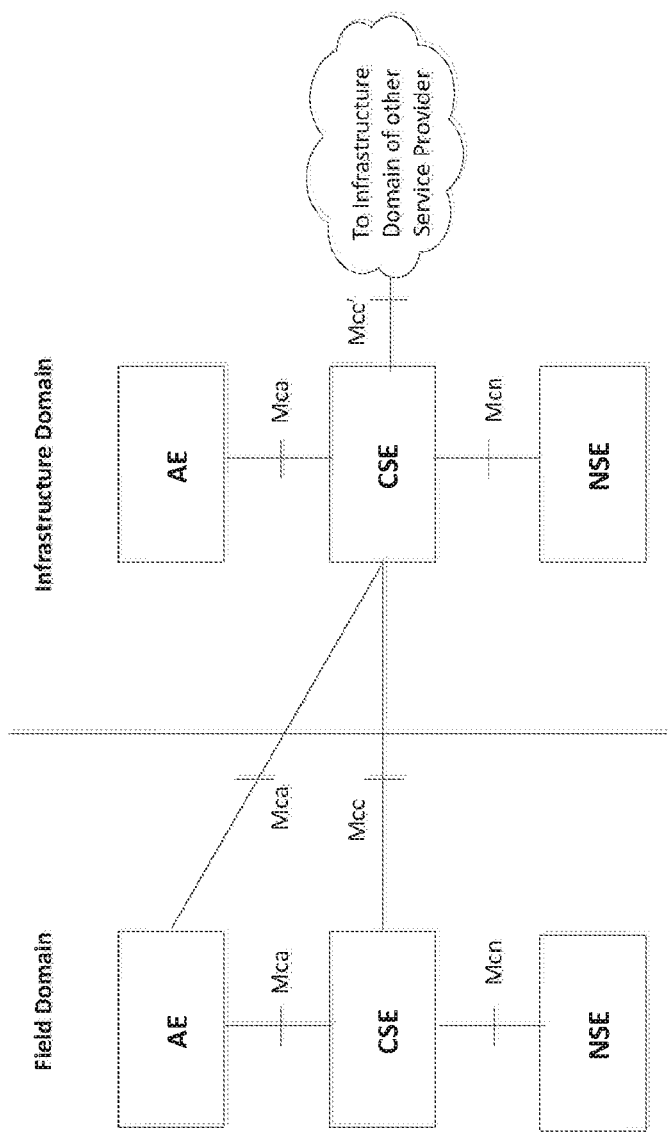
FIG. 6 is a diagram that illustrates a oneM2M service layer functional architecture (ROA).

OneM2M is developing the service layer in a RoA (Resource Oriented Architecture) shown in FIG. 6. A resource is a uniquely addressable element in the architecture having a representation manipulated via RESTful methods such as Create, Retrieve, Update, and Delete. These resources are addressable using a Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

Charging Mechanism in oneM2M ROA

Figure 7:
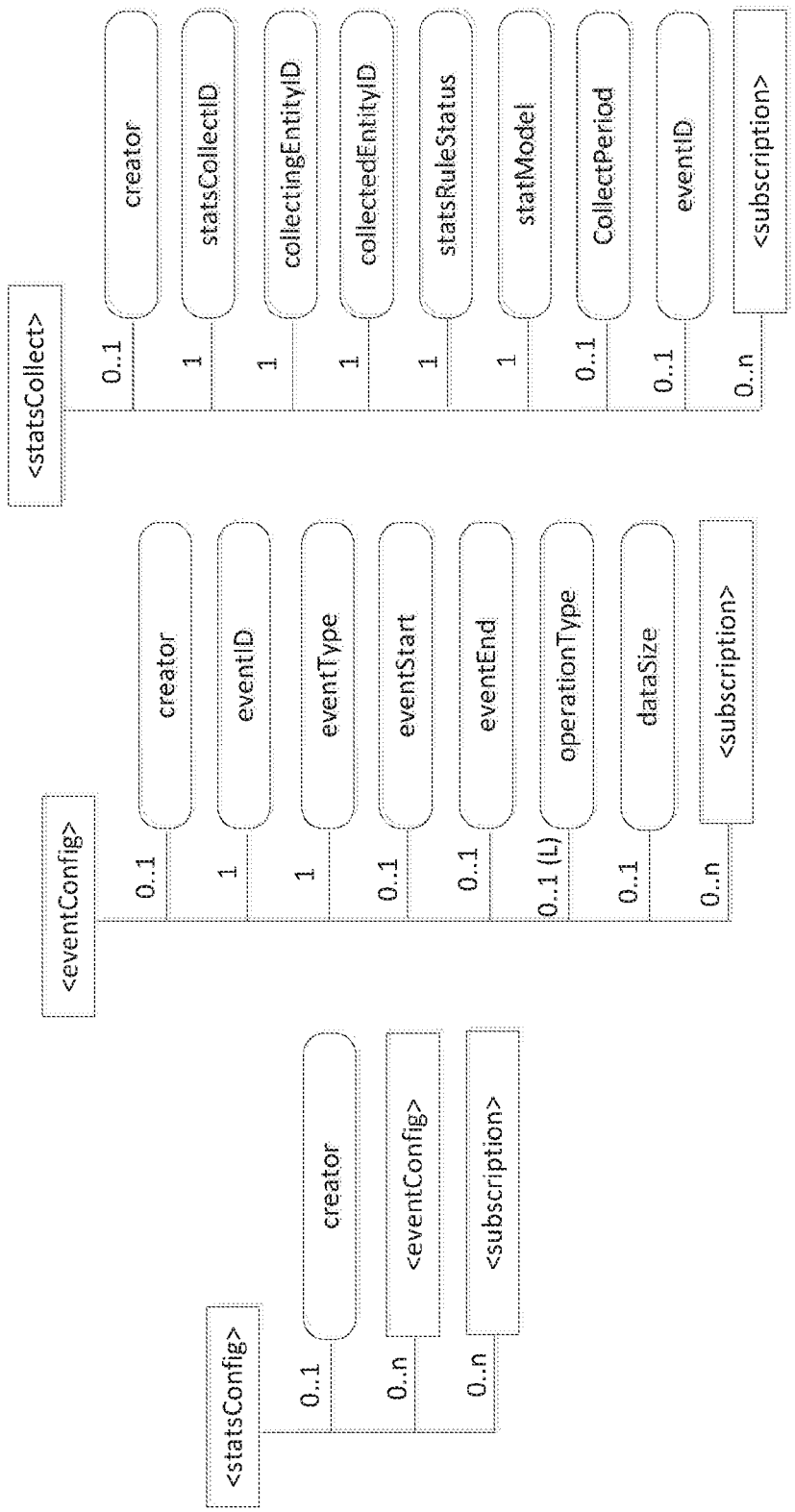
FIG. 7 is a diagram that illustrates resources for information record for oneM2M ROA.

Some resources are defined in eM2M-TS-0001 to enable the charging activity, or information record in general shown in FIG. 7.

<eventConfig>: defines an event corresponding to a service layer operation. From charging perspective, it defines a charging event.

<statsConfig>: contains a list of <eventConfig> resources representing various types of events configured by different service providers or application service providers.

<statsCollect>: defines some conditions as well as what information will trigger information collection for a given charging event.

Figure 8:
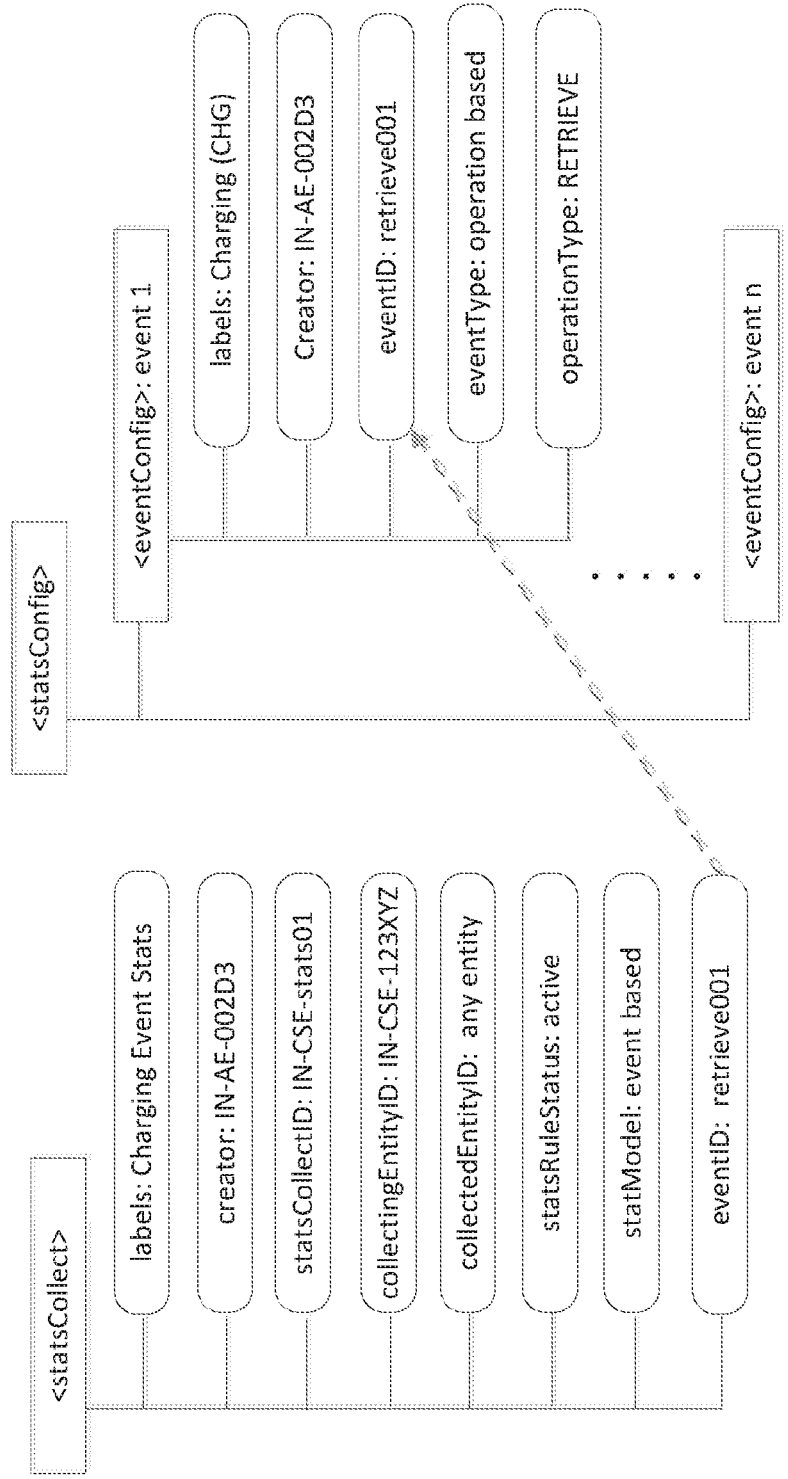
FIG. 8 is a diagram that illustrates an example of usage of resources for charging.

FIG. 8 shows an example of these resources used for charging. The example also reveals the relationship among these resources.

Figure 9:
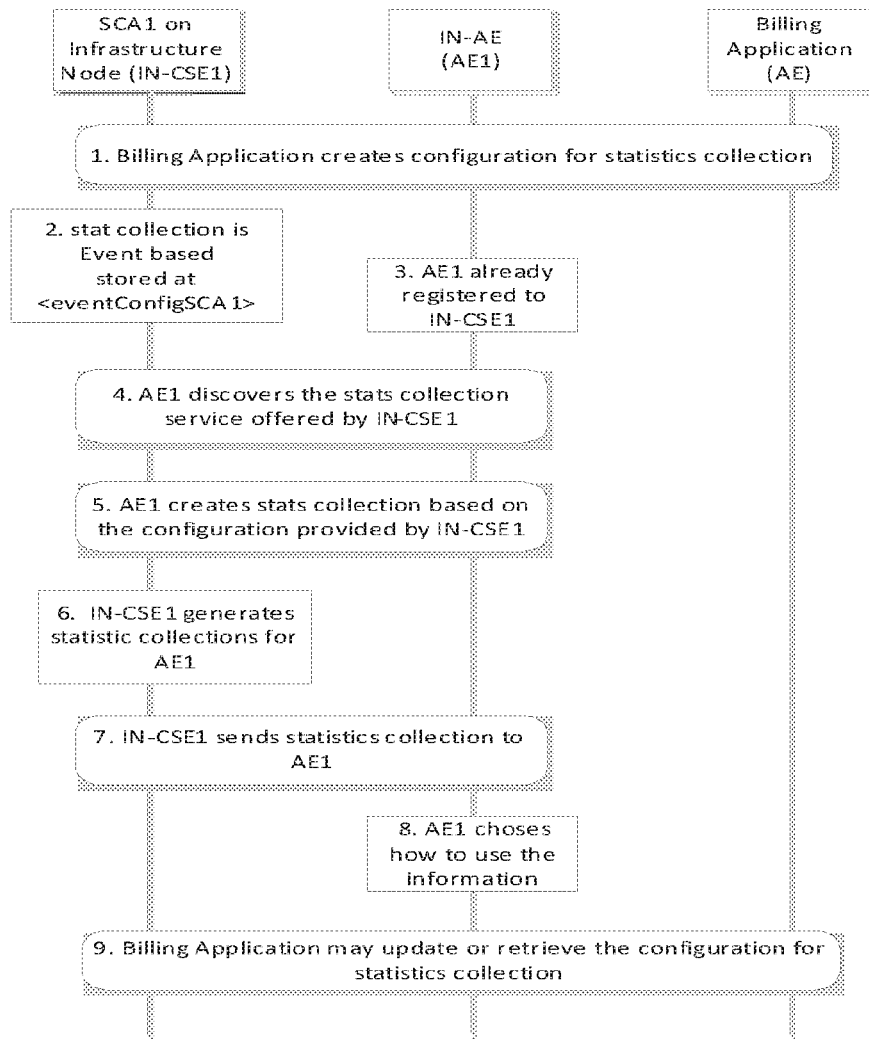
FIG. 9 is a diagram that illustrates an event-based statistics collection for applications.

FIG. 9 shows an example of service layer event-based charging based on the Infrastructure Node, where SCA is 'service charging and account' CSF defined by oneM2M.

Although FIGS. 8 and 9 define the resources and basic procedure to perform charging at service layer, this is not sufficient to perform advanced charging mechanism. To fully utilize various application information in charging procedures, advanced mechanisms are required with more information elements defined.

Existing Messaging Based Middleware Architectures

IT services can be deployed on varying operational environments (hardware platforms, operating systems, etc.). Message Based Middleware provides a "message layer" between communicating services, thus abstracting the underlying operational environment that each service runs on. In other words, the "message layer" acts as a middleman in exchanging messages between services.

A middleware layer can be based on the concept of a message Queue. Queue based middleware architecture can take many different forms; there may be a single shared queue that is used to send messages to all services, a dedicated Queue for each service to receive messages from, a dedicated Queue for each service to send messages to, etc.

In a Publish/Subscribe model, messages are sent (published) to a destination in the middleware. The destination depends on the message "topic". Services that want to receive messages related to a particular topic "subscribe" to the topic. The term message broker commonly refers to entity that receives all messages and distributes all messages. The broker may be implemented with a number of queues, as a publish/subscribe architecture with a number of topics, etc.

Advanced Message Queuing Protocol (AMQP) is a message bus protocol. A message bus is a type of middleware. An AMQP Exchange accepts messages from a service and routes the message to one or more Queue. The Exchange can be designed to route the message based on a static rule (i.e., all send the message to these 5 services), based one whatever queues bind themselves to the exchange, based on the message topic, or based on values in the message header.

The Message Queuing Telemetry Transport (MQTT) [OASIS MQTT V3.1.1 Committee Specification 01, 18 May 2014] is another message bus protocol. MQTT is a low overhead message queuing and transport protocol tailored for constrained devices and low bandwidth networks that is most famously deployed in the Facebook Messenger mobile application.

Open Message Bus (OMB)

Figure 10:
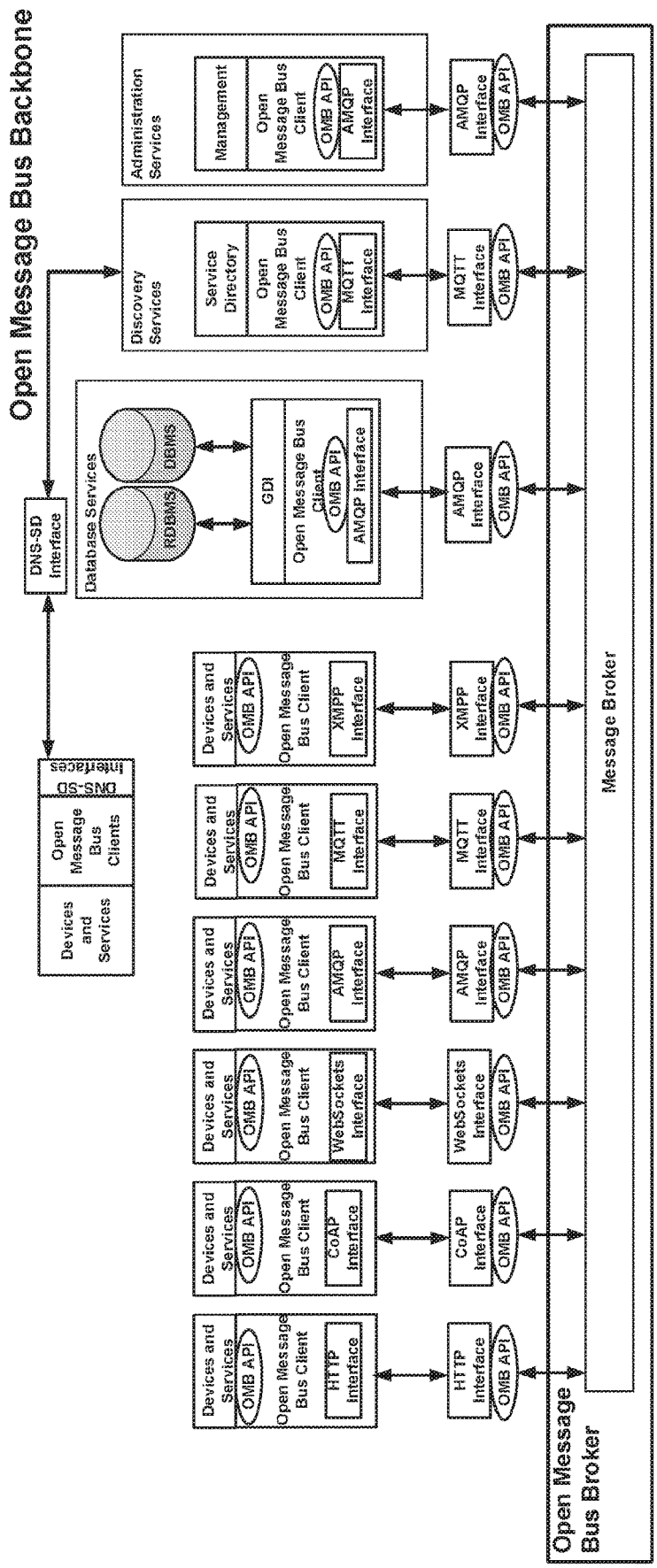
FIG. 10 is a diagram that illustrates an open message bus (OMB) architecture.

OMB is a messaging system architecture developed for providing connectivity and communication between services. FIG. 10 shows the OMB architecture.

The OMB backbone offers some infrastructure services that can be leveraged by all services connected to the OMB. The infrastructure services include database services, discovery services, and administration services.

The OMB Database Service is used by all other services to store and query information. Database Services are designed on top of the Generic Database Interface (GDI) service. The core of the database service (RDBMS and DBMS) are largely unaware of the OMB. The GDI service is designed to interface to the OMB API's. The main functions defined in GDI service are registration or de-registration to database service, create/update/retrieve/delete information in database and query on database.

The OMB Discovery Service is used for dynamic discovery and publishing of services connected to the OMB. The OMB Directory Service supports a DNS Service Discovery (DNS-SD) interface as well as an OMB interface. The DNS-SD interface allows services to browse the service directory without accessing the OMB. This is particularly useful when services want to dynamically check what services are offered by the OMB before deciding to join the OMB.

The OMB Administration Services are used for administering and monitoring client services connecting to the OMB.

Once a service joins the OMB, it becomes an OMB client. An OMB client can subscribe to the service directory and receive notifications when particular services or classes of services connect, or disconnect from the OMB. All services interface to the OMB via OMB clients, which provide a layer of abstraction (i.e., API) between the services and the underlying transport networks (e.g., AMQP, UDP, MQTT, XMPP, WebSockets, etc.) used by the OMB.

Use Cases

Figure 11:
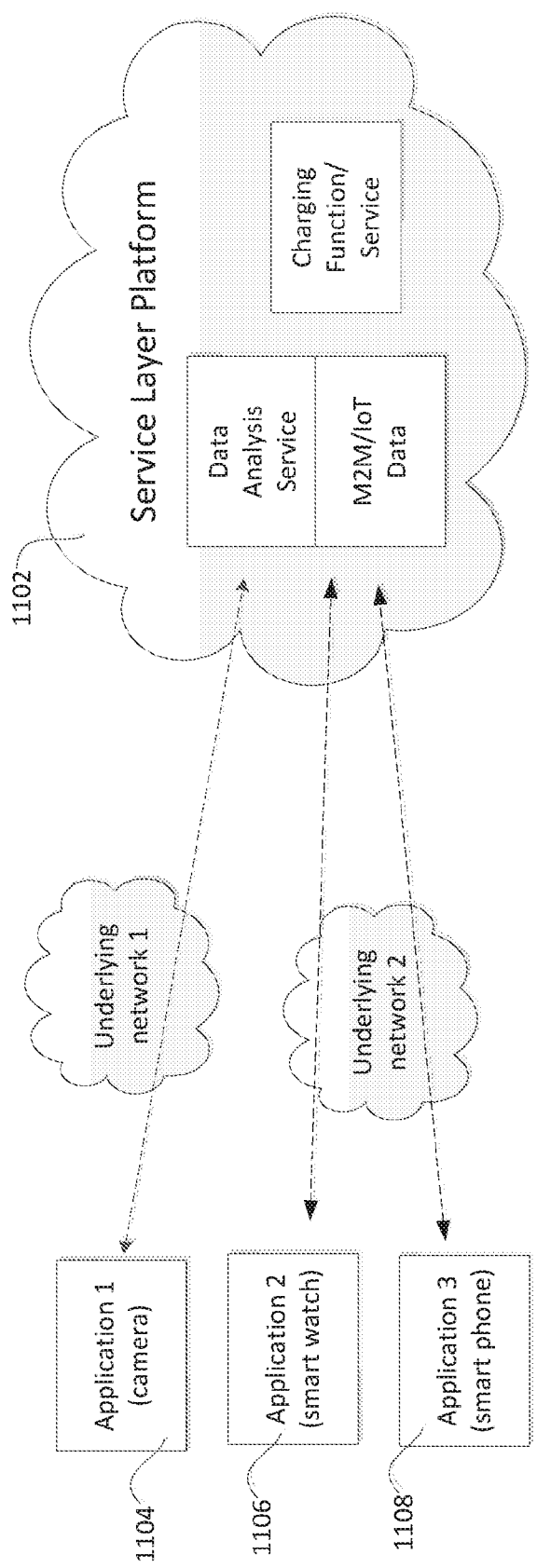
FIG. 11 is a diagram that illustrates a use case for flexible charging for data analysis service and data provision service.

A use case is shown in FIG. 11 to demonstrate the flexible service layer charging based on the service/application context. The service layer platform 1102 provides the data storage service and data analysis service. Applications 1104, 1106 and 1108 upload data to the platform, which provides the storage. In this sense, the application is charged by the platform operator for using the data storage service. On the other hand, the data stored in the platform could be retrieved by other applications. In this scenario, a data consuming application is charged by the application providing the data. If the data consuming application also utilizes the data analysis service when retrieving the data, it will also be charged by the platform operator, i.e., service provider. Data provider and service provider will configure the charging policy, respectively. In addition, the service layer platform 1102 has its own charging system to collect the charging information, and feed this information to the billing system.

Based on the subscription profile, different applications may be applied with different charging models (i.e., charging entity, charging method, rate and measurement):

Application 1 (video camera 1104) subscribes data storage service. It uploads the video to the service layer platform 1102. Therefore, application 1 is charged by the platform operator for storing the data based on the data volume it uploads.

Application 2 (smart watch 1106) subscribes the data storage service with a fixed monthly subscription fee. It periodically uploads the medical measurements (e.g., heart beat) to the platform.

Application 3 (smart phone 1108) subscribes to both types of the data. In the meantime, it subscribes to the analysis service combined with only the medical data. It will be charged based on the data volume of the video it retrieves from the platform by the data provider (i.e., video camera). In addition, online charging method is used. For the medical information, it will get notification when the medical data is processed by the analysis service, which shows some abnormal medical condition. The notification is the result of the data analysis service. Platform operator charges application 3, per notification sent out. Essentially, application 3 is charged by using medical data and analysis capability together.

The service layer charging can become very flexible given more application information and service context.

The flow-based charging model is used in the conventional transport network (e.g., 3GPP), i.e., the user is charged per service flow, which could be based on the amount of data transferred or data speed (i.e., bits per second) for using the network resource. Today, network operator applies more sophisticated charging mechanisms by using some context information, such as charge based on content provider, based on peak time versus non-peak time, based on type of access network. However, that context information is mainly device level or conventional context information, and there is not much application level information used. It is not easy for transport network entity to access the application information or the service context, and to interpret the application level information. In other words, the network entity in the transport network may not be able to differentiate the content of a service flow, e.g., whether the data being retrieved is about the medical information or weather report.

On the other hand, as shown in the use case and as discussed above, more application and service context is available at the service layer. In turn, the service layer network entity is more capable of accessing and interpreting this information. Even for the same service, different applications may be charged under the different charging methods, charging rates, and charging measurements. Service layer is more capable of differentiating content and context information delivered to applications, i.e., service-awareness. Therefore, service layer charging could be more flexible than charging mechanisms in the transport network.

However, current service layer charging mechanisms are not sufficient to enable such flexibility. What information to collect, how to collect the required context information and how to pass this information to billing system is not yet defined. Even for the offline charging, billing domain is responsible for making the decision, but the billing domain still relies on the service context that is collected at and transferred from the service layer platform 1102.

In addition, for implementing the service layer online charging, which requires the real-time decision, it is not defined how to configure the rating information and how to perform the online charging including the rating functionality. Without these mechanisms and the necessary information elements, it is difficult to perform the online charging within the service layer platform 1102 independent of the underlying network charging system.

Functional Architecture for Flexible Charging Service

According to an aspect of the application, the architecture, procedures and parameters for enabling the flexible service layer charging are provided. The architecture and procedures presented are general for other service layer systems. The parameters included in the resource and primitives are presented in oneM2M terms. 3GPP is shown as an example to describe the architecture of flexible service layer charging with underlying network. It is envisaged the architecture and procedures presented in this section could be applied to other types of underlying network.

Figure 12:
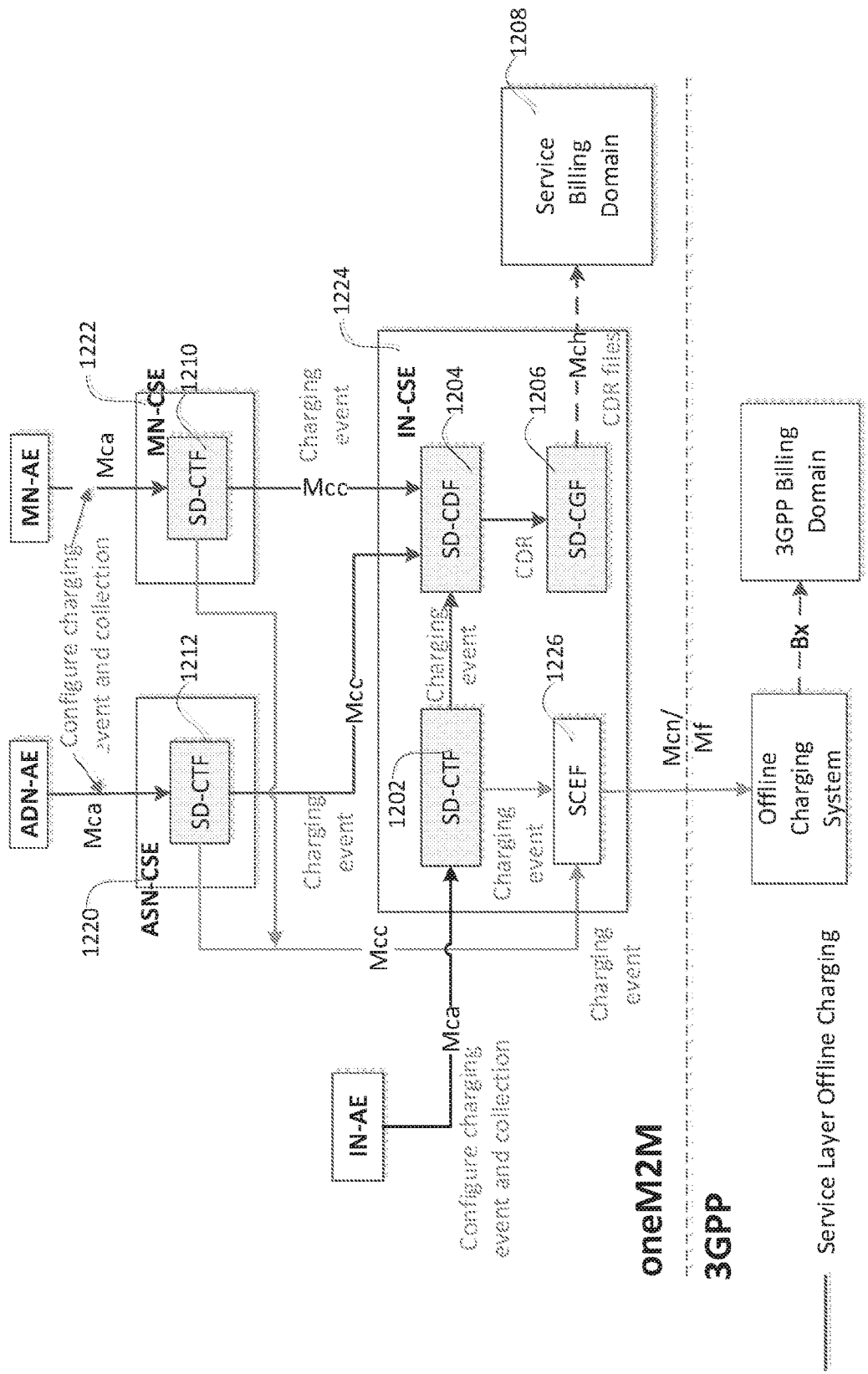
FIG. 12 is a diagram that illustrates a functional architecture of oneM2M service layer offline charging.

FIG. 12 shows the architecture of a service layer offline charging system including the service layer billing domain. 3GPP offline charging system is included as an example to show how charging correlation can be performed between the service layer and underlying network. Note that it is possible to perform correlation of charging information with other types of underlying networks (e.g., broadband networks, etc.). Service layer charging service is provided by the following logic functions shown in FIG. 12.

Service Domain Charging Triggering Function (SD-CTF) 1202 can be configured to detect various chargeable events for different services, detecting when the event (s) occur, collecting information about the event(s), and reporting the occurrence of the event and the related details to the SD-CDF.

Service Domain Charging Data Function (SD-CDF) 1204 is responsible for generating the CDRs when it receives charging event information from SD-CTF 1202.

Service Domain Charging Gateway Function (SD-CGF) 1206 acts as a gateway between the service layer and the service layer Billing Domain 1208. Once CDRs are generated at SD-CDF, they will be transferred to the SD-CGF 1206. The SD-CGF 1206 may perform the following functions:

Processing CDRs, e.g., CDR validation: including checking if the CDR follows the pre-defined format, if the CDR contains the required information, and if some parameters in CDR are valid and proper.

Generate CDR files and transfer the CDR files to service Billing Domain 1208.

It is assumed that service domain charging triggering functions (SD-CTF 1202, 1210 and 1212) may reside in different types of CSE (i.e., ASN-CSE 1220, MN-CSE 1222 and IN-CSE 1224) to capture charging events; while the service domain charging data function (SD-CDF 1204) and service domain charging gateway function (SD-CGF 1206) reside only in the IN-CSE 1224 (i.e., server in the infrastructure domain) to generate CDR and CDR files respectively.

The offline charging architecture covers the following deployment scenarios:

Scenario 1: service layer has a complete and independent offline charging system (i.e., SD-CTF 1202, SD-CDF 1204 and SD-CGF 1206) as well as service Billing Domain 1208, so that service layer could do the offline charging without any assistance from underlying network (e.g., 3GPP). The charging event and statistic collection information may be configured by either service provider or application. The SD-CTF in CSE is responsible for monitoring and capturing details of the charging event.

Scenario 2: Service layer only has SD-CTF 1202 to capture and report charging information, while it does not have SD-CDF/SD-CGF and billing system. Service layer charging relies on charging system in the underlying network, e.g., the 3GPP OFCS and billing system. Therefore, SD-CTFs send service layer charging event information to 3GPP OFCS through SCEF 1226 (NSSE in oneM2M term). For CSE without SCEF 1226 (e.g., home gateway, MN/ASN-CSE in oneM2M term), the collected charging event information is transferred to a transit CSE that has the SCEF capability.

The functionality illustrated in FIG. 12 may be implemented in the form of software (i.e., computer-executable instructions) stored in a memory of, and executing on a processor of, a wireless device or other apparatus (e.g., a server, gateway, device, or other computer system), such as one of those illustrated in FIG. 22C or 22D described below. The functionality illustrated in FIG. 12 may also be implemented as a set of virtualized network functions. The network functions may be not necessarily communicate directly, rather, they may communicate via forwarding or routing function.

Figure 13:
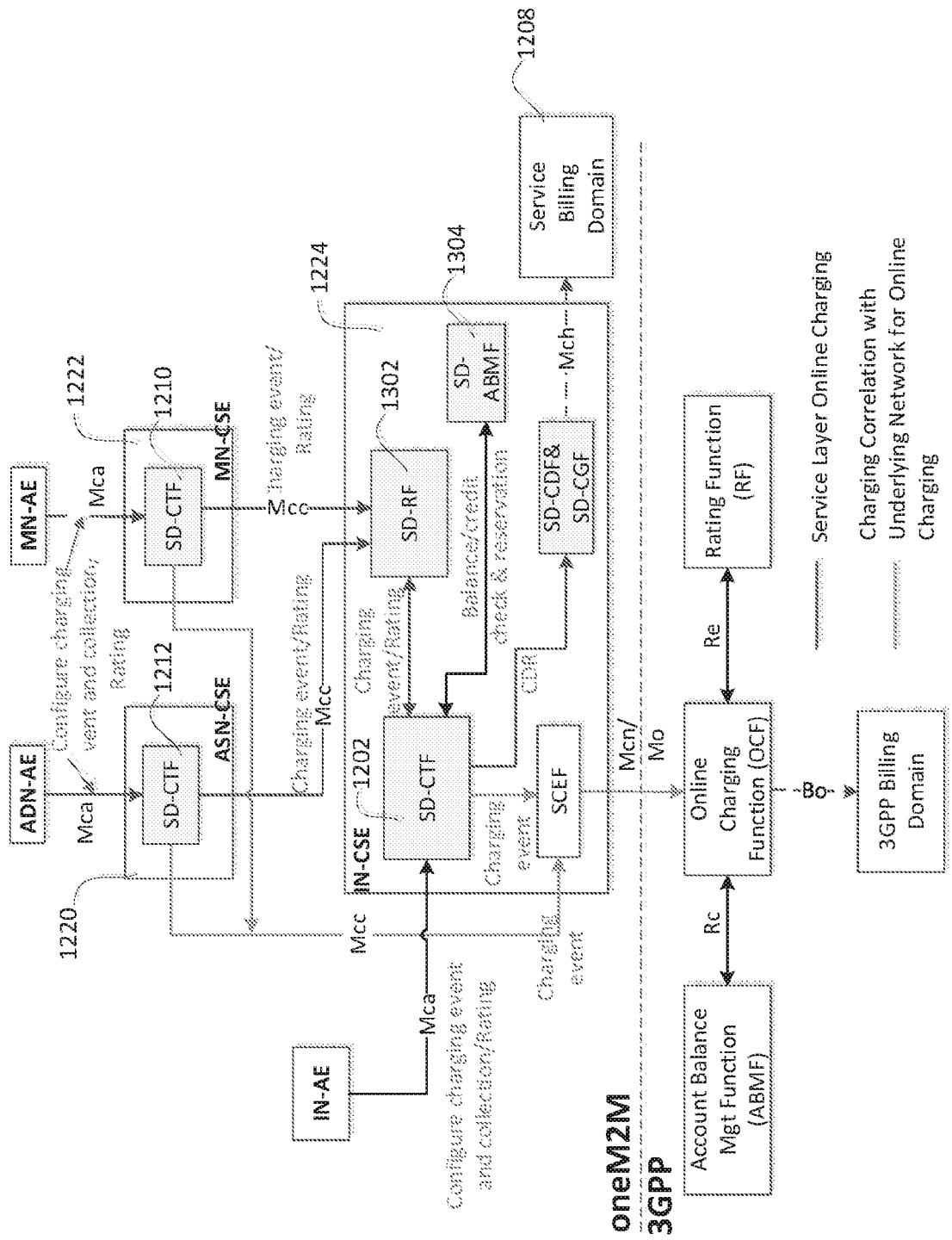
FIG. 13 is a diagram that illustrates a functional architecture of oneM2M service layer online charging.

In an embodiment, FIG. 13 shows the functional architecture of a service layer online charging system with the service layer Billing Domain 1208. 3GPP OCS is shown as an example to show how charging correlation can be performed between the service layer and underlying network for the online charging.

Compared to the functionalities deployed for the offline charging, the following new logical functionalities are deployed to facilitate the service layer online charging:

New functionality of SD-CTF 1202:
  Interact with Service Domain Rating Function (SD-RF) 1302 to trigger the rating calculation based on request from the originator
  Interact with Service Domain Account and Balance Management Function (SD-ABMF) 1304 to verify if the originator has sufficient credit to afford the service as requested, and ask SD-ABMF 1304 to reserve and update the account.

Monitor and track the resource usage during the service delivery in a real-time manner.

Terminate the service delivery if granted resource/units are used up or expired, or communicate with SD-RF 1302 and SD-ABMF 1304 to get more resource granted to continue service delivery when granted resource is used up.

Service Domain Rating Function (SD-RF) 1302: identify the rating scheme that should be used for online charging event, and calculate the cost for using the requested service. SD-CTF 1202 provides necessary information about charging event, and receives the rating output (required amount of service units and monetary cost) from SD-RF 1302, which contains two main functions:

Unit determination: calculation of the number of non-monetary units (service units, data volume, time and events) that shall be assigned prior to starting service delivery for originator Price determination (i.e., rating): the calculation of a price out of the non-monetary units calculated by the unit determination.

Service Domain Account and Balance Management Function (SD-ABMF) 1304: maintain and manage the subscriber's account balance.

FIGS. 12 and 13 illustrate the functional architecture. This is not from an implementation perspective. The architecture shown in the embodiment will indicate how to build the system. Moreover, the charging correlation (interworking) between the service layer and underlying transport network is shown in both figures. The 3GPP network is an exemplary underlying network.

The functionality illustrated in FIG. 12 may be implemented in the form of software (i.e., computer-executable instructions) stored in a memory of, and executing on a processor of, a wireless device or other apparatus (e.g., a server, gateway, device, or other computer system), such as one of those illustrated in FIG. 22C or 22D described below. Also, the functionality illustrated in FIG. 13 may implemented as a set of virtualized network functions. The network functions may not necessarily communicate directly, rather, they may communicate via forwarding or routing function.

Procedures for Service Layer Offline Charging

Figure 14:
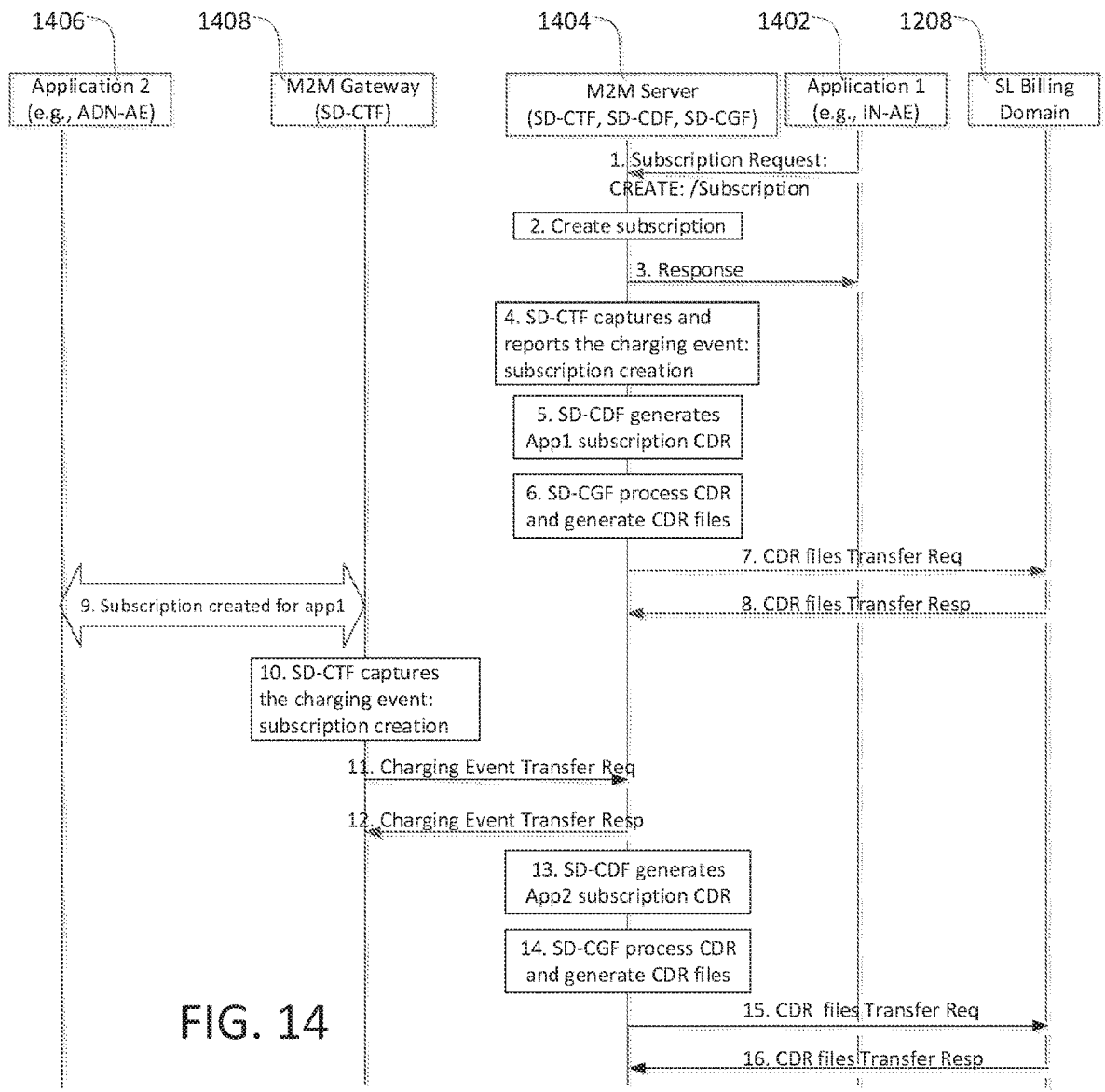
FIG. 14 is a diagram that illustrates an example of offline charging procedure for charging event of "subscription creation".

In another embodiment, as exemplarily shown in FIG. 14, a call flow of the offline charging system considers the 'service layer subscription creation' as an offline charging event. Two scenarios are covered:

In step 1 to step 8 of FIG. 14, application 1 1402 registers to an M2M server 1404 requests to create a subscription at the M2M server 1404.

The detailed steps are described as follows:

In steps 1 to step 3 of FIG. 14, application 1 1402 exchanges request and response with M2M server to create a subscription on a certain content in the M2M server.

In Step 4 of FIG. 14, the SD-CTF 1202 detects that the subscription creation on the content is configured as an offline charging event by the provider, therefore it collects the required information about the new subscription information, i.e., charging event information. There is interaction between SD-CTF 1202 and subscription/notification service. Specifically, subscription/notification service will notify SD-CTF 1202 that there is a new subscription created, therefore, SD-CTF 1202 will determine if the subscription creation is configured as a charging event.

In Step 5 of FIG. 14, SD-CDF 1204 is triggered internally by generating the CDR based on the new subscription information collected and provided from SD-CTF 1202.

In Step 6 of FIG. 14, SD-CGF 1206 processes the CDR and adds the CDR into the CDR files.

In Steps 7 and 8 of FIG. 14, SD-CGF p1206 assess the new CDR files to the service layer billing system. The CDR related to the event of subscription creation may include the following information:

Charging Record Type
Recording Entity ID
Source Entity ID
Target Entity ID
Charging Event Type
Charging Type
CDR Sequence Number
M2M Subscription ID
M2M External ID
Underlying Network ID
Subscription Limit In step 9 to step 16 of FIG. 14, application 2 1406 registers to an M2M gateway requests to create a subscription at the M2M server. Note, step 9 of FIG. 14 repeats the operations from step 1 to step 3 of FIG. 14.

In Step 9 of FIG. 14, application 2 1406 creates a subscription at M2M server 1404 by repeating steps 1 to 3.

Step 10 of FIG. 14 is a similar operation as step 4.

In Step 11 of FIG. 14, SD-CTF 1202 in the M2M gateway 1408 sends the charging event transfer request message to SD-CDF 1202 in M2M server 1404 for generating CDR. The request message may include the following information:

Event identification: to indicate the charging event that triggers these charging process. Through the event identification, more information could be obtained, such as the type of charging event, the type of operation, identification of entities that should be charged for the event.

Stats collection information: include a list of charging event information that are collected by the SD-CTF 1202, such as the time stamp when the event information was collected, ID of the application that requests to create subscription, type of subscription and notification conditions, and subscription ID.

In Step 12 of FIG. 14, SD-CDF in M2M server returns the charging event transfer response to confirm that it successfully receives the collected charging event information.

Steps 13 to 16 of FIG. 14 are the same as steps 5 to 8.

More details about 'Charging Event Transfer' request/response message are presented below. The entities performing the steps illustrated in FIG. 14 may be logical entities that may be implemented in the form of software (i.e., computer-executable instructions) stored in a memory of, and executing on a processor of, an apparatus configured for wireless and/or network communications or a computer system such as those illustrated in FIG. 22C or FIG. 22D. That is, the method(s) illustrated in FIG. 14 may be implemented in the form of software (i.e., computer-executable instructions) stored in a memory of an apparatus, such as the apparatus or computer system illustrated in FIG. 22C or FIG. 22D, which computer executable instructions, when executed by a processor of the apparatus, perform the steps illustrated in FIG. 14. The functionality illustrated in FIG. 14 may implemented as a set of virtualized network functions. The network functions may not necessarily communicate directly, rather, they may communicate via forwarding or routing function. Any transmitting and receiving steps illustrated in FIG. 14 may be performed by communication circuitry of the apparatus under control of the processor of the apparatus and the computer-executable instructions (e.g., software) that it executes.

Procedures for Service Layer Online Charging with Rating Function

Figure 15:
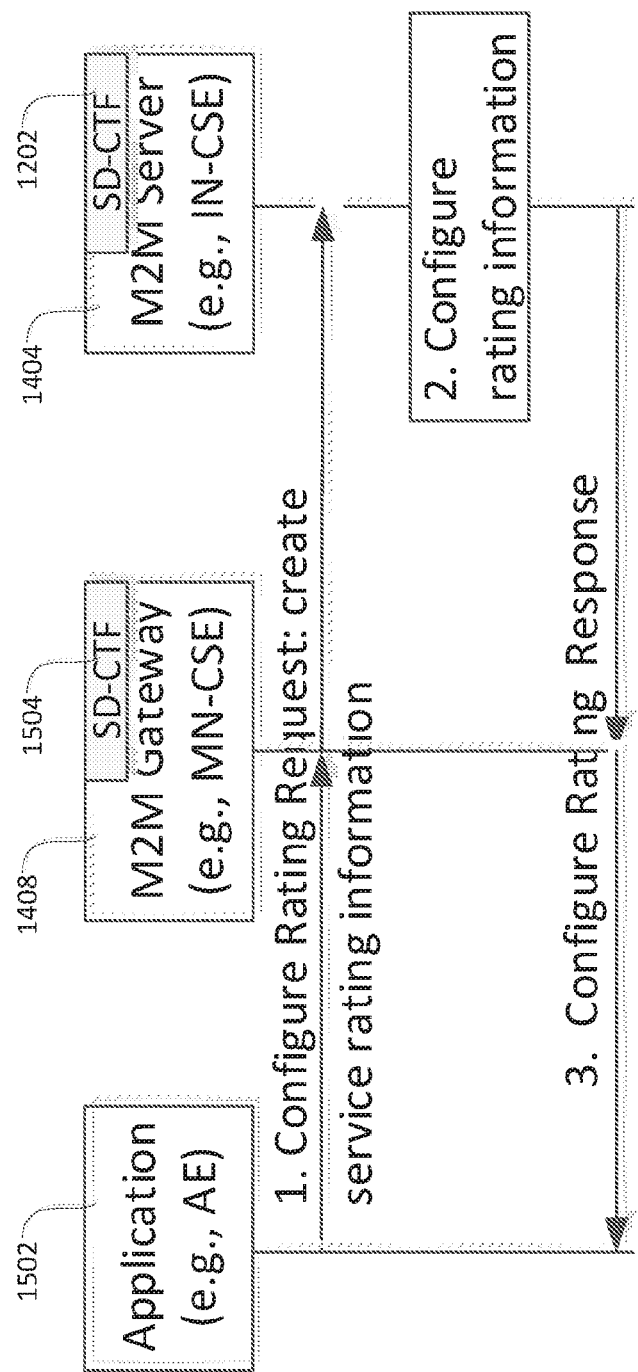
FIG. 15 is a diagram that illustrates a procedure of configure rating information.

According to another aspect of the application, procedures for service layer online charging with a rating function are described. In an exemplary embodiment, FIG. 15 shows a procedure of configuring the rating information/scheme for an online charging event by an application 1502, which registers with an M2M gateway 1408. Note, it is also possible that the application registers with an M2M server 1404 directly, or the service provider (i.e., CSE) configures this rating information. In this figure, the M2M server 1404 includes SD-CTF 1202; and M2M gateway 1408 includes SD-CTF 1504. The detailed steps are described below as follows:

In Step 1 of FIG. 15, the application 1502 sends a 'configure rating request' message to the M2M gateway 1408, which forwards the request to the M2M server 1404. The request message may include the following parameters about the rating information:

Reference to an online charging event: is used to build the link between the online charging event and this rating information. In other words, this indicates this rating information/scheme is applied to which online charging event.

List of applications to which this rating scheme is applied: provides a list of applications (i.e., users) the provider wants to charge using this rating information.

Online charging scenario: indicates which online charging scenario (i.e., reservation based or event based) is used regarding the combination of online charging event and rating scheme. An example of an event may be a resource read (retrieve) or write (create/update) operation.

Service unit measurement: indicates the service unit (e.g., volume, time, transaction) which the entity will be charged based on. Note, for the same charging event, different applications/users may be charged with different types of units.

Cost per service unit: indicates the price (i.e., monetary cost) regarding service unit for the online charging event.

Note, the rating configuration could be performed through a separate step from the charging event and stats collection configuration, and could be done after configuration of charging event and stats collection is complete.

In Step 2 of FIG. 15, upon receiving the request message, the M2M server 1404 stores this rating information internally.

In Step 3 of FIG. 15, 'configure rating response' message is returned to the originator, i.e., application 1502.

More details about the 'Configure Rating' request/response message are presented below.

Figure 22A:
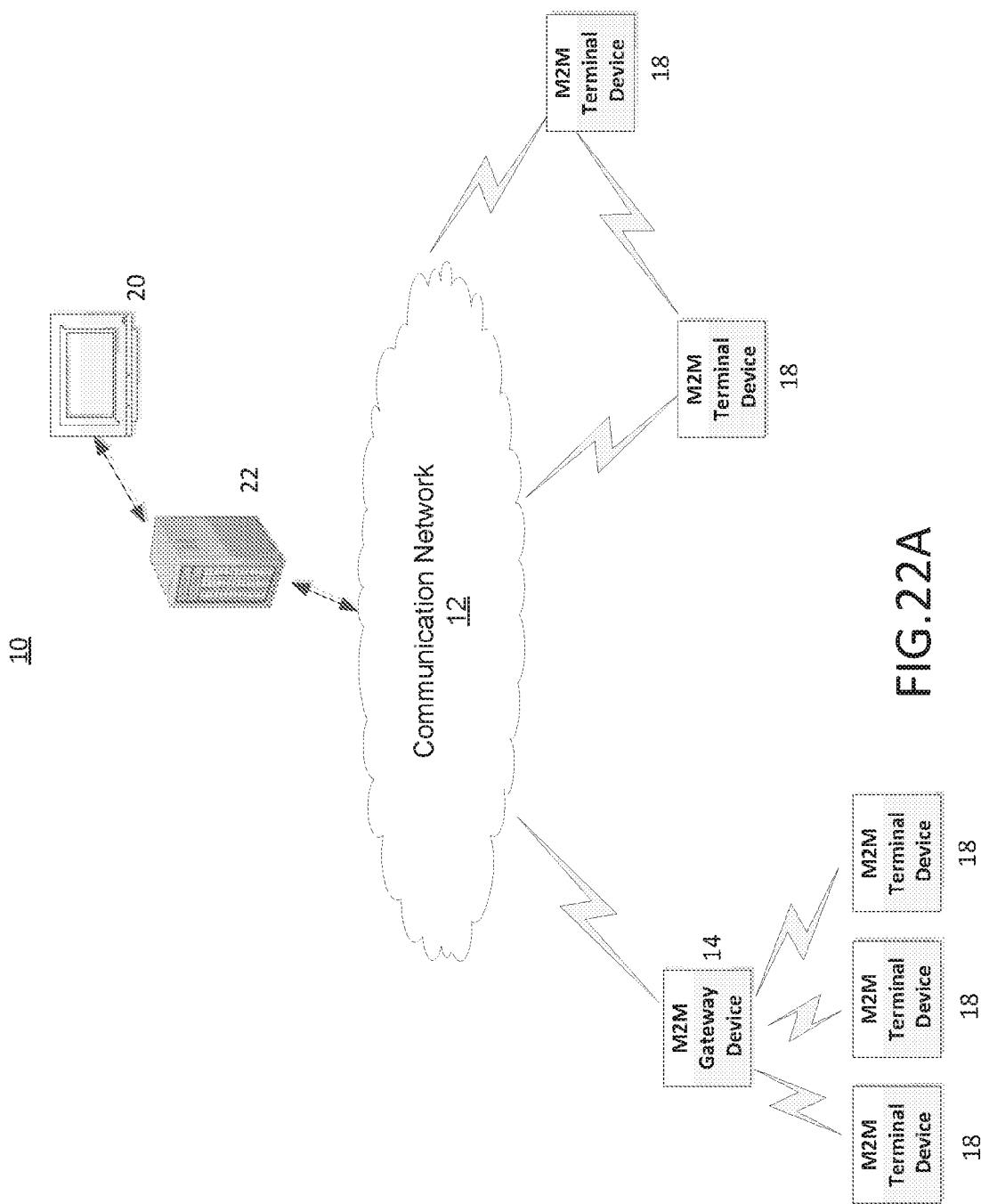
FIG. 22A is a diagram of a M2M/IoT/WoT communication system that includes a communication network.
Figure 22B:
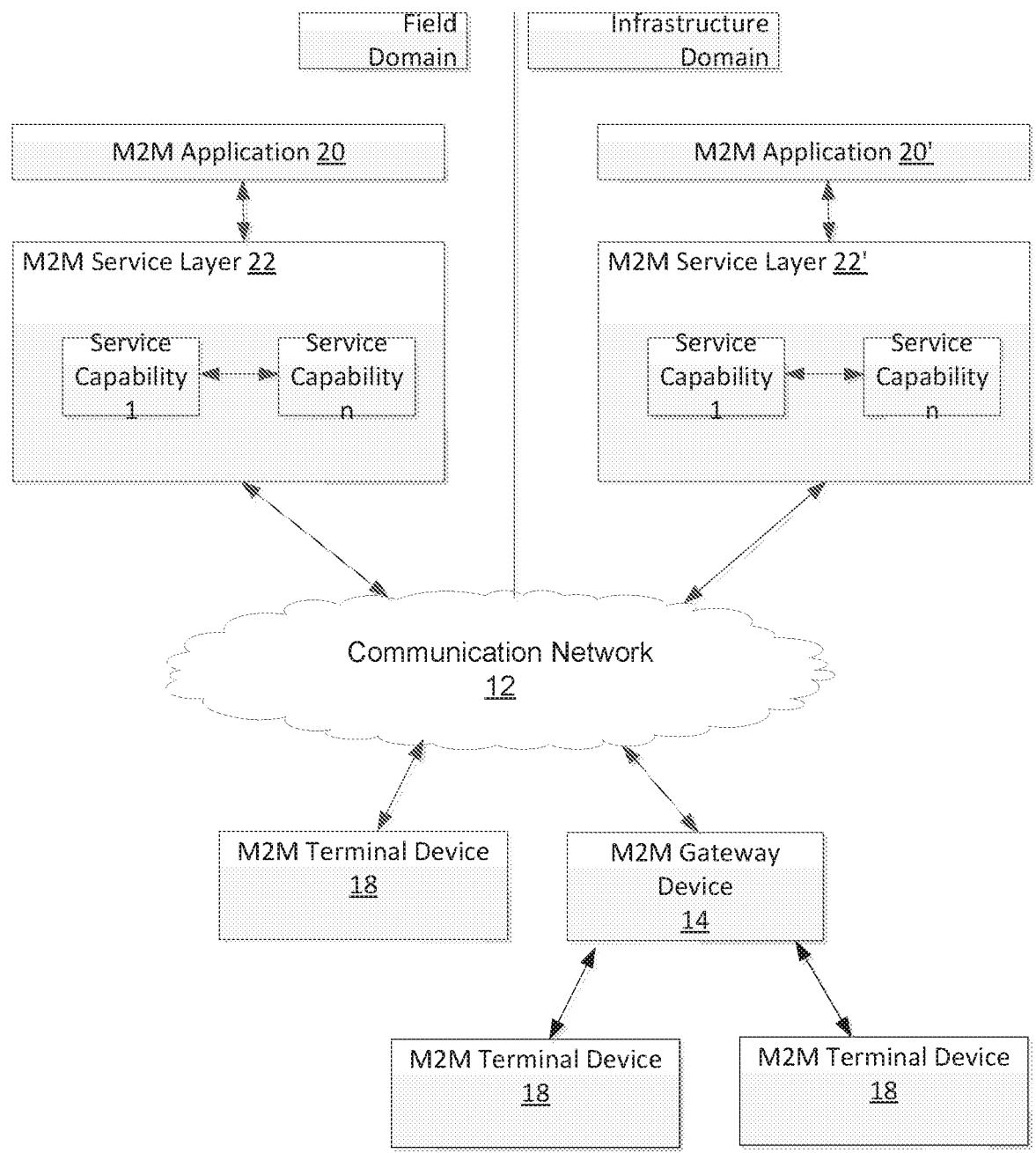
FIG. 22B is a diagram of an illustrated M2M service layer in the field domain that provides services for the M2M application, M2M gateway devices, and M2M terminal devices and the communication network.
Figure 22C:
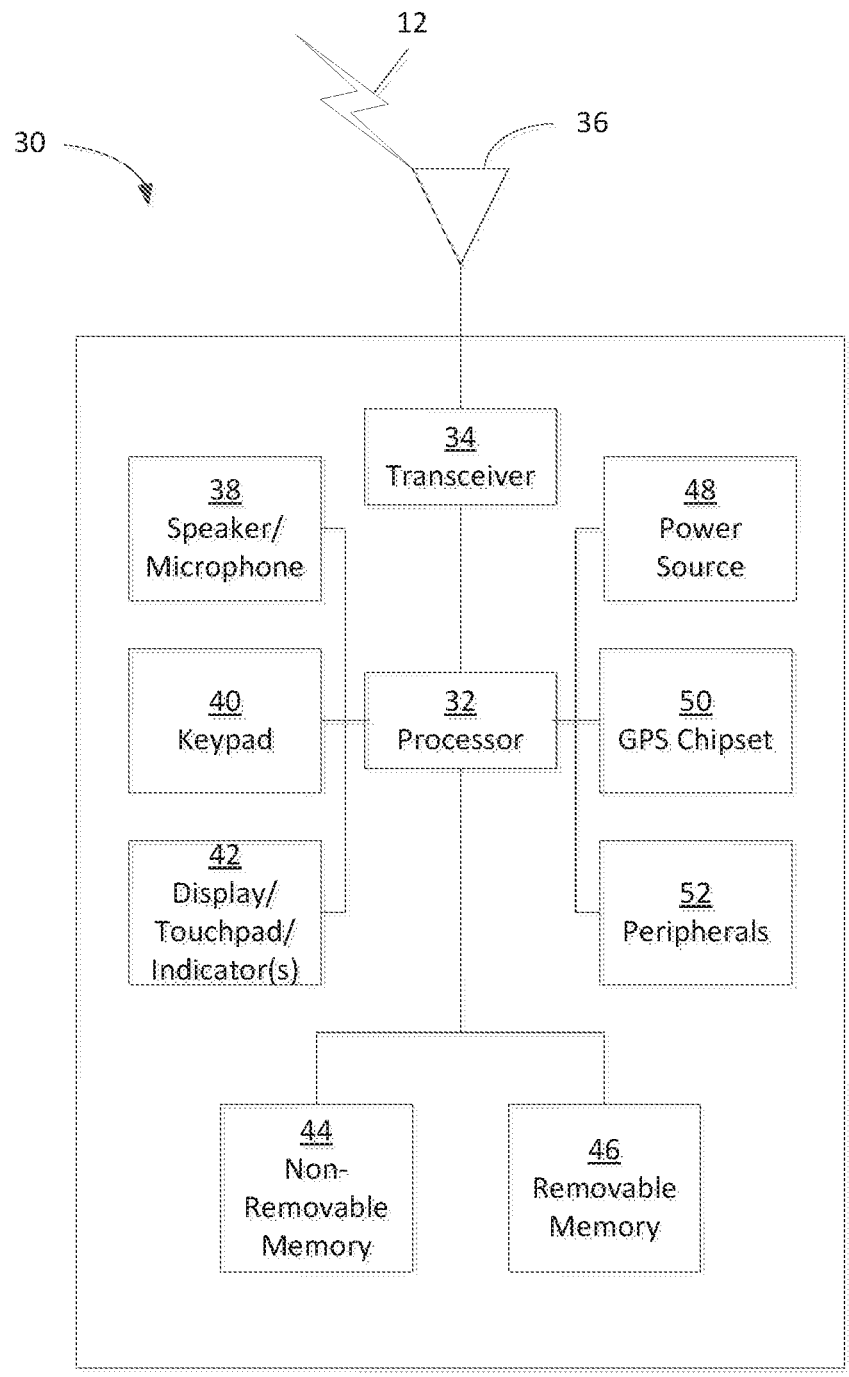
FIG. 22C is a diagram of an exemplary device that may be used to implement any of the network nodes, devices or apparatuses described herein.
Figure 22D:
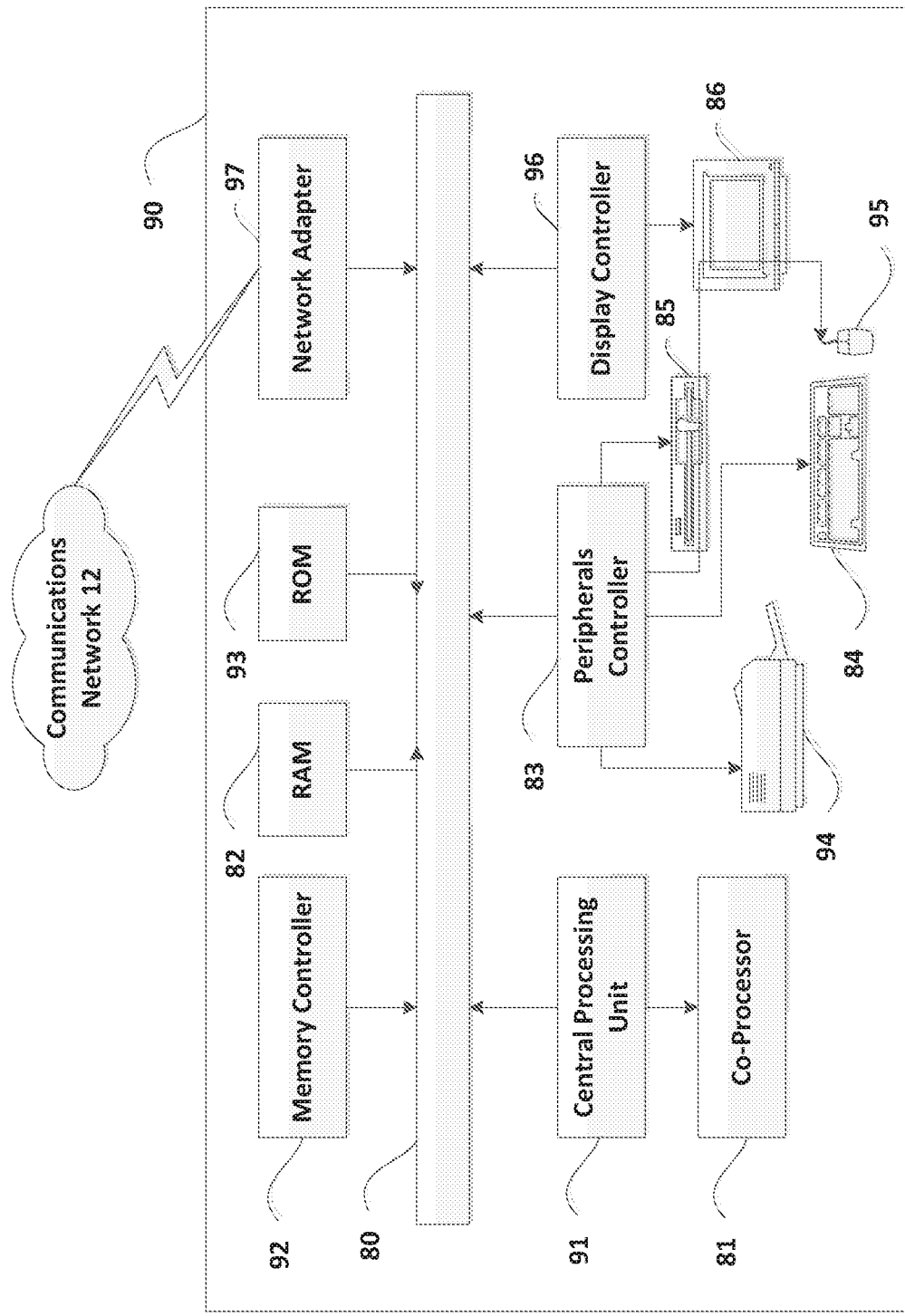
FIG. 22D is a block diagram of a computer system or server that may be used to implement any of the network nodes, devices or apparatuses described herein.

The entities performing the steps illustrated in FIG. 15 may be logical entities that may be implemented in the form of software (i.e., computer-executable instructions) stored in a memory of, and executing on a processor of, an apparatus configured for wireless and/or network communications or a computer system such as those illustrated in FIG. 22C or FIG. 22D. That is, the method(s) illustrated in FIG. 15 may be implemented in the form of software (i.e., computer-executable instructions) stored in a memory of an apparatus, such as the apparatus or computer system illustrated in FIG. 22C or FIG. 22D, which computer executable instructions, when executed by a processor of the apparatus, perform the steps illustrated in FIG. 15. It is understood that the functionality illustrated in FIG. 15 may implemented as a set of virtualized network functions. The network functions may not necessarily communicate directly, rather, they may communicate via forwarding or routing function. It is also understood that any transmitting and receiving steps illustrated in FIG. 15 may be performed by communication circuitry of the apparatus under control of the processor of the apparatus and the computer-executable instructions (e.g., software) that it executes.

Reservation Based Online Charging with Rating Function

Figure 16:
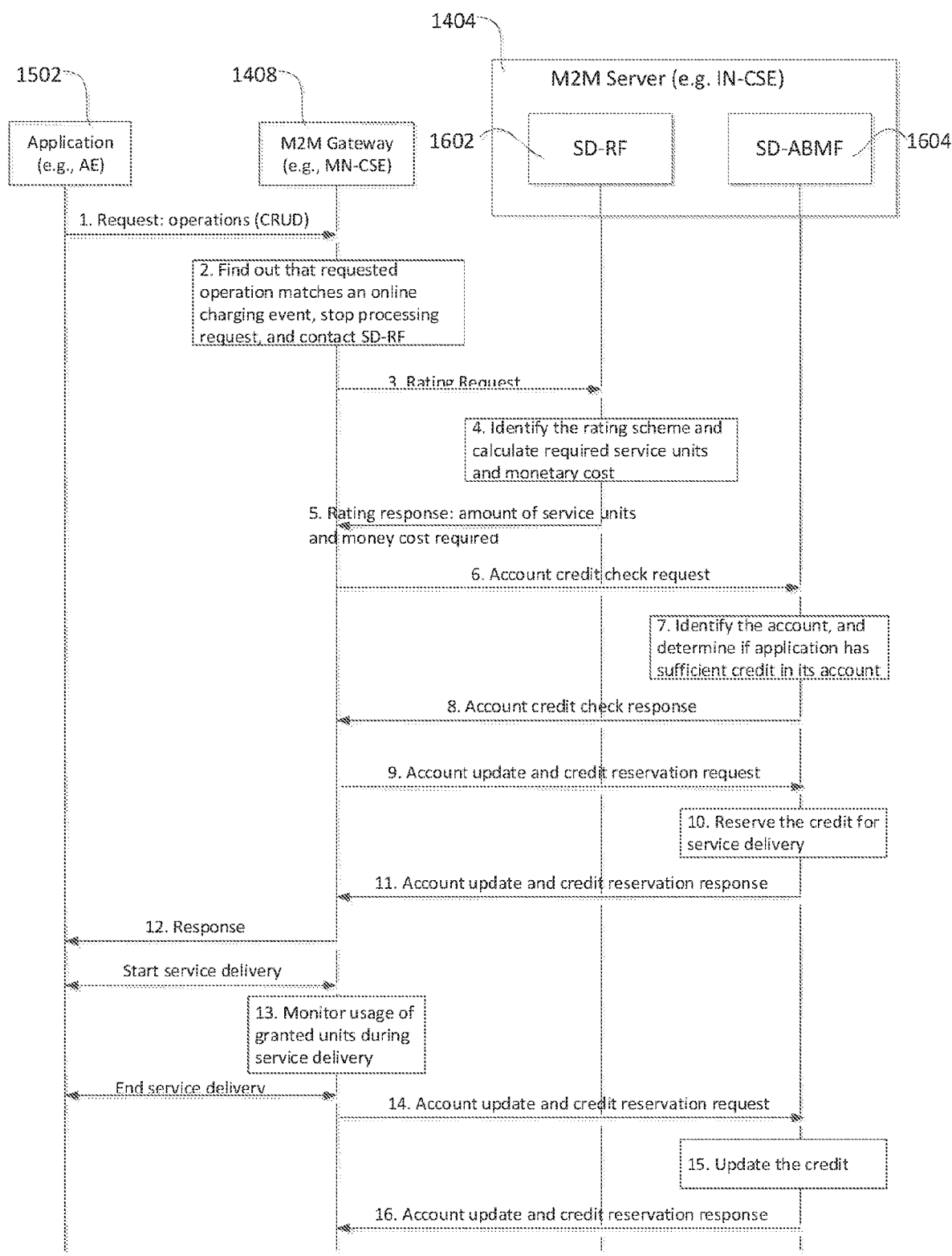
FIG. 16 is a diagram that illustrates procedures of reservation based service layer online charging with rating function.

According to yet another aspect, as exemplary depicted in FIG. 16, a procedure of reservation based service layer online charging is described. Here, the service units are granted and sufficient for a successful service delivery. The detailed steps are described as follows:

In Step 1 of FIG. 16, an application 1502 sends a request for a certain operation, e.g., CRUD.

In Step 2 of FIG. 16, M2M gateway 1408 identifies that the requested operation is configured as an online charging event. To achieve this, M2M gateway 1408 may compare the charging events configured and maintained at its database with the information carried in the request message. The SD-CTF residing in the M2M gateway 1408 is responsible for performing this operation. Before this, there is an internal interaction within the M2M gateway between the SD-CTF and subscription/notification service. Specifically, SD-CTF is notified that there is a request received, and then SD-CTF would attempt to identify a charging event regarding the request message.

In Step 3 of FIG. 16, after identifying the online charging event, M2M gateway 1408 stops processing the request message, and sends a rating request message to the SD-RF 1302, which is assumed to reside in the M2M server 1402. The rating request message may include the following information:

Online charging event name or ID

Application identification

Requested operation or services

Required quantity of the requested operation/service if any

In Step 4 of FIG. 16, once receiving the rating request, the rating function determines which rating scheme to employ. Since applications may be charged under different rating schemes for the same online charging event, rating function applies the online charging event information (e.g., reference to the online charging event resource), application identification and requested operation/service to make the decision. With the rating scheme determined, the rating function calculates the required amount of the service units and actual cost based on the requested operations/services from originator.

In Step 5 of FIG. 16, the rating function returns the required amount of service units and actual costs to the M2M gateway 1408.

In Step 6 of FIG. 16, M2M gateway 1408 then sends an 'account credit check' request to the account balance and management function to see if there is sufficient credit in the application's account for the required cost. This request message may include the following information:

The required amount of service units and cost calculated and returned by the rating function.

Application ID: this is used together with the service provider ID to identify the account.

Application's external ID: this is included only when the application's external ID is available. This external ID will be converted to the application ID.

Service provider ID or service layer platform operator ID: this is used together with the application ID to identify the account.

This step may be performed together with the step 4. In other words, the SD-RF 1302 can calculate the rating and check the credit information in one step. If so, step 6 and step 7 would be combined with steps 4 and 5 respectively.

In Step 7 of FIG. 16, SD-ABMF 1604 first needs to identify the account considering the application ID and service provider/service layer platform operator ID, since an application may have different accounts with different service providers. With the account identified, the SD-ABMF 1604 decides whether the application has sufficient credits to afford the service delivery by comparing the actual cost included in the 'account credit check' request.

In Step 8 of FIG. 16, 'account credit check' response is returned to indicate if application has sufficient credit to afford service delivery as requested. If it is, then M2M gateway starts step 9; otherwise, M2M gateway goes to step 12 by sending response to the originator (i.e., application) to indicate that the step 1 request is rejected due to insufficient credit.

In Steps 9 to 11, M2M gateway 1408 sends the 'account update and credit reservation' request to SD-ABMF 1604 to reserve the credit before starting service delivery. In the request, gateway needs to indicate: 1. it requests SD-ABMF 1604 to reserve some credits instead of update; 2. the amount of credits to be reserved.

SD-ABMF 1604 reserves the credit and returns the response to confirm. It is possible that steps 9 to 11 could be performed in combination with steps 6 to 8 respectively. In this sense, the request sent through step 6 is combined with step 9 request, and therefore the information included in both requests are put together.

In general, steps 3 to 11 could be integrated or merged as one request/response exchange, where the rating calculation and account management operations could be done in one operation.

In Step 12, M2M gateway 1408 returns a response to the application to indicate the service units are granted, and request is accepted; or request is rejected with the cause code.

In Step 13, SD-CTF in the M2M gateway 1408 monitors the usage of granted service units during the service delivery. If the granted service units are used up before service delivery ends, M2M gateway 1408 pauses the service delivery and contact the rating function to repeat the online charging process from step 3. This step is optional. If the requested operation is done at once, then this step could be merged into the service delivery step.

In Steps 14 to 16, when the service delivery successfully ends, the M2M gateway 1408 estimates the actual usage of service units and monetary cost, and sends the request to SD-ABMF 1604 to update the account of the application. The 'Rating' request/response message is described below in more detail.

The entities performing the steps illustrated in FIG. 16 may be logical entities implemented in the form of software (i.e., computer-executable instructions) stored in a memory of, and executing on a processor of, an apparatus configured for wireless and/or network communications or a computer system such as those illustrated in FIG. 22C or FIG. 22D. That is, the method(s) illustrated in FIG. 16 may be implemented in the form of software (i.e., computer-executable instructions) stored in a memory of an apparatus, such as the apparatus or computer system illustrated in FIG. 22C or FIG. 22D, which computer executable instructions, when executed by a processor of the apparatus, perform the steps illustrated in FIG. 16. The functionality illustrated in FIG. 16 may implemented as a set of virtualized network functions. The network functions may not necessarily communicate directly, rather, they may communicate via forwarding or routing function. It is also understood that any transmitting and receiving steps illustrated in FIG. 16 may be performed by communication circuitry of the apparatus under control of the processor of the apparatus and the computer-executable instructions (e.g., software) that it executes.

The application also envisages some other likely scenarios for reservation-based online charging. For example, if the service units granted are not sufficient, the SD-CTF can pause the service delivery and request more service units to continue the service delivery. Alternatively, the request is rejected due to insufficient credit in the application's account. In another alternative embodiment, the rating is changed during the service delivery because certain parameters (e.g., QoS parameters) of the service provision are changed. In general, these scenarios require slightly different procedure but the main flows are similar to the one shown in FIG. 16.

New Resources and Attributes

According to yet another embodiment, from the charging perspective, the <eventConfig> resource can be used to define a charging event that may trigger a series of charging activities. The <eventConfig> resource also specifies some conditions expected to be met for collecting and reporting the charging event. In other words, an <eventConfig> resource represents a pre-defined charging event with some conditions (e.g., eventStart, eventEnd and dataSize attributes).

To enable flexible service layer charging, this disclosure adds two new attributes into the <eventConfig> to further differentiate types of charging events considering more service context. Table 1 describes the new attribute. Table 2 lists possible conditions included in the 'eventCriteria' attribute since it is a list of values.

Without the chargingEventType attribute, it would not be possible to determine if an online or offline charging model should be applied to the event. Without the eventCriteria attribute, it would not be possible to make the event configuration depend on the request initiator, the type of resource, or the resource location.

TABLE 1

| New attribute of <eventConfig> | Multiplicity | RW/ RO/ WO | Description |
| --- | --- | --- | --- |
| chargingEventType | 0 . . . 1 | WO | This attribute indicates if the charging event is an offline charging event or an online charging event. |
| eventCriteria | 0 . . . 1(L) | RW | This attribute contains a list of conditions in addition to eventStart, eventEnd and dataSize attributes used for defining an event. Provides finer granularity to identify events, such as client ID, application information and service category. |

TABLE 2

| Conditions | Multiplicity | Matching Condition |
|---|---|---|
| resourceType | 0 . . . 1 | Indicate types of resource for which the charging event is supposed to be captured and reported. This could be used to differentiate the same operation on different types of information that triggers the charging activity. For example, creating subscription on <group>, location information, and device management will be considered as different events with different information collected and reported by SD-CTF. This could be a list of resource types, or URIs of a list of specific resources. |
| originEntityID | 0 . . . 1 | Indicate the ID(s) of entities that are originator of operations regarding this event. With respect to charging, this is the entity that will be charged for the event. This could be AE-ID or CSE-ID. |
| locationRestriction | 0 . . . 1 | This parameter is used to restrict the event to a specific location or a certain area. In other words, anything that happens outside the specified location or area is not considered as defined event. This could also be the logic location, such as service provider's network. |

According to another embodiment, <statsCollect> resource defines some conditions as well as what information to trigger information collection for a given charging event referred to through <eventConfig>. A new attribute further defines what information to collect for a given charging event. Table 3 shows the new attribute, and Table 4 lists several possible parameters included in the new attribute list. The parameters in the 'statsToCollect' attribute is customized, i.e., configured by the service provider or the entity responsible for charging.

TABLE 3

| New attribute of <statsCollect> | Multiplicity | RW/ RO/ WO | Description |
|---|---|---|---|
| statsToCollect | 0 . . . 1(L) | RW | Includes some statistics information to collect for the linked charging event. |

TABLE 4

| Conditions | Multiplicity | Matching Condition |
|---|---|---|
| underlyingNwkID | 0 . . . 1 | ID of the underlying access network through which an entity is retrieving data. Used for CDR correlation. |
| M2MExternalID | 0 . . . 1 | ID of the subscriber if the subscriber is an external entity, e g., a 3GPP MTC UE. |
| dataAmount | 0 . . . 1 | Amount of data that has been retrieved, created (storage), updated or deleted. |
| M2MSubID | 0 . . . 1 | M2M-Sub-ID that enables the service provider to bind applications, M2M nodes, CSEs and services to identify a particular service subscription. |
| StatsRequired | 0 . . . 1 | Indication of whether charging stats record is required when the event information is collected. Especially for online charging, since online charging system makes the real-time decision, and CDR is not mandatory. |
| processingMeasure | 0 . . . 1 | Indicate the measurement metric of the operation/service regarding the charging event and stats collection |
| applicationID | 0 . . . 1 | ID of application that is involved in the stats collection. |
| AE-IDs | 0 . . . 1 | ID of AE that is involved in the stats collection. |
| credentialIDs | 0 . . . 1 | List of credential IDs for entities that are involved in this stats collection |

According to a further embodiment, a new <statsRecord> resource to store the collected charging information is described. This may be considered as the service layer CDR. In general, attributes in this new resource should be similar to the information specified by 'statsToCollect' attribute in <statsCollect> resource.

Table 5 shows the attributes and child-resource of the new <statsRecord> resource, which may be created and maintained under a <CSEBase> resource.

TABLE 5

| Attribute of <statsRecord> | Multiplicity | RW/ RO/ WO | Description |
|---|---|---|---|
| creator | 1 | RO | The AE-ID of the entity, which created the resource. This can also be the CSE-ID of the CSE if the CSE created the resource. |
| statsCollectID | 1 | RO | This is the unique ID as the reference to a <statsCollect> resource to identify a specific statistics collection scenario. It is created by the CSE when this <statsrecord> resource is first created. |
| collectingEntityID | 1 | RO | This is the unique ID of the entity that collects these statistics information. It can be an AE-ID or CSE-ID. |
| collectedEntityID | 1 | RO | This is the unique ID of the entity, which is charged for triggering the charging event referred to as 'eventID' attribute. |
| RecordID | 1 | RO | Unique ID of this charging stats information |

TABLE 5-continued

| Attribute of <statsRecord> | Multiplicity | RW/ RO/ WO | Description |
|---|---|---|---|
| recordStatus | 1 | RW | Indicate the stats of this CDR. 'closed' means the CDR is already added into a CDR file, 'open' means CDR is not added to any CDR file yet, and 'error' means there is some problem (e.g., lack of certain information). |
| collectPeriod | 1 | RW | Expresses time periods defined by second, minute, hour day of month, month, and year. Supports repeating periods, and wildcards expressed as a list. |
| eventID | 1 | WO | This attribute refers to the <eventConfig> resource that defines the event that triggers the stats collection. |
| chargingMethod | 1 | WO | Indicate if the charging method applied is offline or online. If online charging is applied, this attribute further indicates if the reservation based or event based online charging is applied. |
| statsCollectRecord | 0 . . . 1(L) | RW | Includes some specific charging information for a given event configured by the service provider/vendor |

According to a further embodiment, a new <serviceRating> resource is used for the rating process during the online charging procedure. This new resource is defined and used for service layer online charging. Table 6 shows the attributes in the <serviceRating> resource.

Since there may be multiple rating rules defined for an online charging event by the same or different entities, eventID together with creatorID and chargedEntityID could be used to uniquely identify which rating rule should be applied for a specific application or user. In addition, the service subscription information (e.g., subscription ID) and/or credential information (e.g., credential ID) is used to link the online charging event and application with the rating method/scheme.

TABLE 6

| Attribute of <statsRecord> | Multiplicity | RW/ RO/ WO | Description |
|---|---|---|---|
| creator | 1 | RO | The ID of the entity, which created the resource. This can be an AE-ID, CSE-ID or service provider ID. |
| serviceRatingID | 1 | RO | This is the unique ID to identify a rating rule. It is created by the CSE when the <serficeRating> resource is first created. |
| serviceUnit | 1 | WO | This indicates the service unit (e.g., volume, time, combination of the both, CPU processing usage, expiration time as deadline for online charging) which the entity will be charged based on. Even for the same charging event, different units may be applied to different entities for the charging. |
| pricePerServiceUnit | 1 | WO | This indicates the cost (i.e., monetary unit) per service unit. |
| ratingRuleStatus | 1 | RW | This attribute indicates whether the rating rule/scheme is "active" or "inactive". |
| onlineChargingScenario | 1 | RW | Indicates the charging scenario that should be applied, i.e., event based or reservation based. |
| chargedEntityID | 1 | RW | This is the unique ID of the entity (e.g., AE) that will be charged based on this rating rule. If this attribute is not present, the rating scheme will be applied to any entity that triggers the charging event referenced through eventID attribute. |
| eventID | 1 | WO | This attribute refers to the <eventConfig> resource that defines the events this rating scheme will be applied to. |

TABLE 6-continued

| Attribute of <statsRecord> | Multiplicity | RW/ RO/ WO | Description |
|---|---|---|---|
| credential-ID | 0 . . . 1 | WO | credential information of an entity (e.g., AE) that could be used to link the entity to be charged with the rating method/scheme |

A new <accountInfo> resource is defined, and used for account management for the service layer online charging only. This is used to maintain the account information of a user/client, so that online charging process could check the account balance, and update/reserve credit for using the service. Table 7 shows the attributes in <accountInfo> resource.

Note, the accountID and entityID attributes uniquely identify an account, which implies that an entity (e.g., application) may have different accounts under different service providers.

TABLE 7

| Attribute/Child-resource of <statsRecord> | Multiplicity | RW/ RO/ WO | Description |
|---|---|---|---|
| creator | 1 | RO | The ID of the entity which created the resource. This can be an AE-ID or CSE-ID. |
| accountID | 1 | WO | This is the unique ID of this account |
| entity ID | 1 | WO | This is ID of the entity (e.g., AE) which is charged from this account. |
| serviceProviderID | 1 | WO | This is ID of service provider, which maintain this account for the user identified by entity ID attribute. An entity may have different accounts under different service providers, but only one account is created for a service provider. |
| accountBalance | 1 | RW | This indicates the monetary balance in the account |
| reservedCredit | 0 . . . 1 | RW | This attribute indicates the credit that is reserved for service delivery in the account if any. Note, if the credits are reserved for multiple events/services/operations, there will be association between each reserve credit and each event. |
| accountStatus | 1 | RW | This attribute indicates whether the account is "active" or "inactive". |
| external-ID | 0 . . . 1 | WO | This indicates the ID of an external entity (e.g., 3GPP MTC UE), If any external entity is associated with this service layer account |

New Virtual Resources

According to a further embodiment, the following two virtual resources can be used:

<rateCalculation>: to trigger the rating function to calculate the service units and cost required for service delivery as part of online charging process <accountManagement>: to trigger account balance management (e.g., update, reserve credit) as parts of the online charging process.

This implies that these two virtual resource are involved only in the corresponding online charging activity, and they do not have a representation in the resource tree.

The new Charging Event Transfer Request primitive is used by SD-CTF for reporting occurrence of a charging event to SD-CDF, so that a CDR will be generated regarding the new charging event. Table 8 shows the interface applicability of Charging Event Transfer Request. Table 9 shows some parameters in Charging Event Transfer Request.

TABLE 8

| Reference Point | | Mcc | Mcn |
|---|---|---|---|
| Originator | 1. | ASN-CSE, MN-CSE, IN-CSE without SD-CDF | IN-CSE or MN-CSE with SCEF |
| | 2. | CSE without SCEF | |
| Receiver | 1. | IN-CSE with SD-CDF | Underlying network charging system |
| | 2. | CSE with SCEF | |

TABLE 9

| Primitive attribute | Mandatory/ Optional | Value (Description) |
|---|---|---|
| primitiveType | M | CHARGING_EVENT_TRANSFER_REQUEST |
| Operation | M | CREATE |
| resourceType | M | <statsRecord> (request to create a CDR corresponding to the reported charging event) |
| To, From, Request Identifier | M | These will be assigned by originator. |
| Content | M | URI of <statsCollect> defining what information to collect (including the eventID pointing to <eventConfig> defining the charging event), and required information for generating CDR |

Charging Event Transfer Response is used to confirm that the target entity successfully receives the Charging Event Transfer Request message. Interface applicability of Charging Event Transfer Response is shown in Table 10.

TABLE 10

| Reference Point | Mcc | Mcn |
|---|---|---|
| Originator | 1. IN-CSE with SD-CDF<br>2. CSE with SCEF | Underlying network charging system |
| Receiver | 1. ASN-CSE, MN-CSE, IN-CSE without SD-CDF<br>2. CSE without SCEF | IN-CSE or MN-CSE with SCEF |

TABLE 11

| Primitive attribute | M/O | Value (Description) |
|---|---|---|
| primitiveType | M | CHARGING_EVENT_TRANSFER_RESPONSE |
| Response code | M | Successful, Unsuccessful |
| To, From, Request Identifier | M | These will be assigned by originator. |
| Content | O | URI of new created <statsRecord> representing the CDR for successful response.<br>Error information for unsuccessful response |

Configure Rating Request is used to configure the rating scheme that will be used for an online charging event.

TABLE 12

| Reference Point | Mca | Mcc | Mcn |
|---|---|---|---|
| Originator | AE | 1. CSE without Configure Rating functionality<br>2. CSE without SCEF (for correlation scenario) | CSE with SCEF |
| Receiver | CSE | 1. CSE with Configure Rating functionality<br>2. CSE with SCEF (configure rating via Mcn for correlation scenario) | Online charging system in underlying network |

TABLE 13

| Primitive attribute | Mandatory/ Optional | Value (Description) |
|---|---|---|
| primitiveType | M | CONFIGURE_RATING_REQUEST |
| Operation | M | CREATE |
| resourceType | M | <serviceRating> (request to create a <serviceRating> resource reflecting the rating of an online charging event for specific users/applications) |
| To, From, Request Identifier | M | These will be assigned by originator. |
| Content | M | Reference to an online charging event, List of applications to which this rating scheme is applied, Online charging scenario, Service unit measurement, Cost per service unit |

Configure Rating Response is used to confirm that the receiving entity successfully receives the Configure Rating Request message.

TABLE 14

| Reference Point | Mca | Mcc | Mcn |
|---|---|---|---|
| Originator | CSE | 1. CSE with Configure Rating functionality<br>2. CSE with SCEF | Online charging system in underlying network |
| Receiver | AE | 1. CSE without Configure Rating functionality | CSE with SCEF |

TABLE 14-continued

| Reference Point | Mca | Mcc | Mcn |
|---|---|---|---|
| | | 2. CSE without SCEF (for correlation scenario) | |

TABLE 15

| Primitive attribute | M/O | Value (Description) |
|---|---|---|
| primitiveType | M | CONFIGURE_RATING_RESPONSE |
| Response code | M | Successful, Unsuccessful |
| To, From, Request Identifier | M | These will be assigned by originator. |
| Content | O | URI of new created <serviceRating> representing the rating information of an online charging event. Error information for unsuccessful response |

The rating request is used to trigger the rating function to start calculating the required cost to support the service delivery as requested by the originator.

TABLE 16

| Reference Point | Mcc | Mcn |
|---|---|---|
| Originator | 1. MN/ASN-C SE if rating information is stored only in IN domain<br>2. CSE without SCEF (for correlation) | CSE with SCEF |
| Receiver | 1. IN-CSE if rating information is stored only in IN domain<br>2. CSE with SCEF (contact underlying OCS via Mcn for correlation) | Online charging system in underlying network |

TABLE 17

| Primitive Attribute | Mandatory/ Optional | Value (Description) |
|---|---|---|
| primitiveType | M | RATING_REQUEST |
| Operation | M | RETRIEVE |
| resourceType | M | Target at virtual resource <ratingCalculation> |
| To, From, Request Identifier | M | These will be assigned by originator. |
| Content | M | URI of <eventConfig> for the identified online charging event, originator's ID, or entity ID that will be charged for this event, service provider ID, service ID |

Rating response is used to confirm that the rating function successfully gets the rating request message, and pass the required service units and monetary costs back.

TABLE 18

| Reference Point | Mcc | Mcn |
|---|---|---|
| Originator | 1. IN-CSE if rating information is stored only in IN domain | Online charging system in underlying network |

TABLE 18-continued

| Reference Point | Mcc | Mcn |
|---|---|---|
| | 2. CSE with SCEF (contact underlying OCS via Mcn for correlation scenario) | |
| Receiver | 1. MN/ASN-CSE if rating information is stored only in IN domain<br>2. CSE without SCEF (for correlation) | CSE with SCEF (correlation scenario) |

TABLE 19

| Primitive attribute | M/O | Value (Description) |
|---|---|---|
| primitiveType | M | RATING_RESPONSE |
| Response code | M | Successful, Unsuccessful |
| To, From, Request Identifier | M | These will be assigned by originator. |
| Content | O | URI of identified <serviceRating> resource representing the rating information of an online charging event. The number of service units and cost required to fulfil the original request for using the service<br>Error information for unsuccessful response, such as no applicable rating rule for identified online charging event and/or identified entity to be charged under service provider ID |

Figure 17:
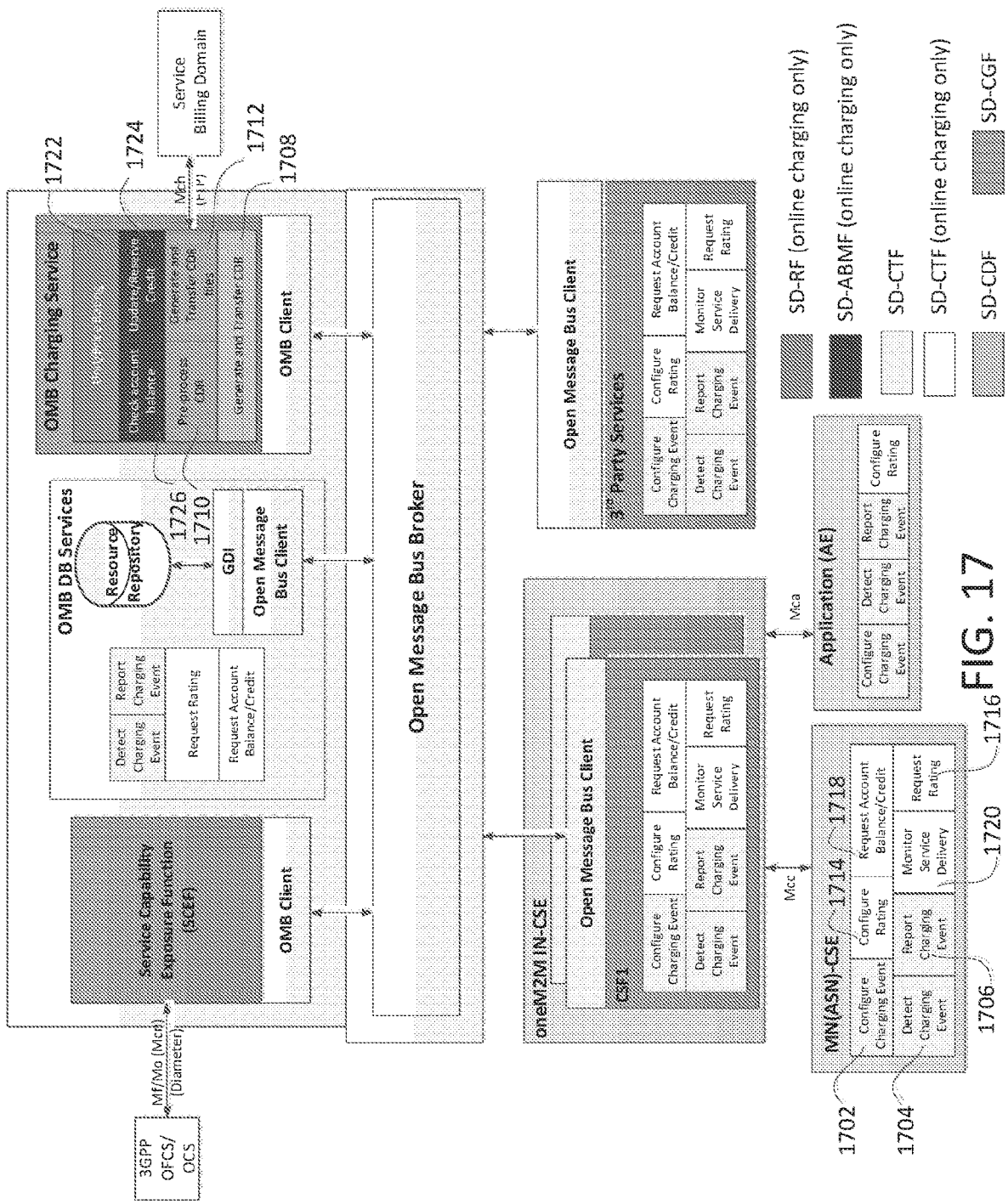
FIG. 17 is a diagram that illustrates an architecture of service layer charging service in OMB with various deployment scenarios.

In a further embodiment, FIG. 17 shows the architecture for implementing service layer charging service in an OMB system covering multiple deployment scenarios. Note that each logical function (e.g., SD-CTF) may be implemented through multiple pieces of functions/services. Some pieces of services (e.g., configuring charging event, generate and transfer CDR) are valid for both offline and online charging, while others (e.g., configuring rating, unit/price rating) are online charging only as indicated by the legend.

This section describes additional details about each piece of services/functions that are shown in FIG. 17. The 'Configure Charging Event' service 1702 is responsible for configuring charging event and stats collection information, i.e., what information to collect for the charging event. It is a piece of function implementing SD-CTF for both offline and online charging. It is CSF/service specific. In other words, each service (e.g., security, group management, device management) configures its own charging events individually. The charging events vary a lot among different services. This service could be invoked any time when a service provider wants to configure (i.e., create, update and delete) a charging event and statistic collection information.

'Detect Charging Event' service 1704 is used for detecting if any configured charging event happens when an operation is performed. It is a piece of function implementing SD-CTF for both offline and online charging.

'Report Charging Event' service 1706 is responsible for collecting and reporting charging event information to SD-CDF when occurrence of a charging event is identified. It is a piece of function implementing SD-CTF for both offline and online charging.

'Generate and Transfer CDRs' Service 1708 supports the CDR generation and CDR transfer from SD-CDF to SD-CGF as a part of OMB backbone charging service. Essentially, generating a service layer CDR requires the creation of a new <statsRecord> resource, which stores the charging data record (CDR) representing the detected charging event following <eventConfig> and <statsCollect>. This service is general for regarding all types of charging events.

These 2 services work on the CDRs produced by SD-CDF, and cooperate together to implement the SD-CGF.

'Process CDR' service 1710 performs the following actions:
  Process a new CDR, e.g., validate parameters, aggregate CDRs together that belong to the same application or the same service provider.
  Integrate the CDR into an existing CDR file or Create a new CDR file including the new CDR.

'Transfer CDR Files' Service 1712 is responsible for transferring CDR files to service layer Billing Domain 1208 and handling the transfer errors if any. The reference point used for CDR files transfer between SD-CGF and service Billing Domain 1208 is defined as Mch. CDR files could be transferred by either push mode or pull mode.

"Configure Rating" Service 1714 is a piece of SD-CTF used for online charging only. Configure rating is used to pre-configure the rating information regarding an online charging event, which will be used by Unit/Price Rating (i.e., SD-RF) for calculating the required service unit and price cost (e.g., $5 per transaction). The rating information defines the cost (service unit and price) for using a service or triggering a charging event.

'Identify Online Charging Event' Service is used to check if any online charging event is triggered corresponding to the requested operations or services. "Identify Online Charging Event" Service is for online charging only.

"Request Rating" Service 1716 is a piece of SD-CTF used for online charging only. In general, this function is triggered when SD-CTF needs the cost of service delivery based on request for an online charging event. Request rating function is responsible for interaction and communication with SD-RF to get the required service units as well as monetary cost. Request Rating may be triggered by the following cases:
  A request is received, requesting an operation, which is configured as an online charging event.
  Rating information is changed.
  Service delivery parameter (e.g., QoS) is changed.

"Request Account Balance and Credit" Service 1718 is a piece of SD-CTF used for online charging only. This function is used to communicate with SD-ABMF when it is necessary to check account balance and/or update/reserve account credit for using service.

"Monitor Service Delivery" Service 1720 is a piece of SD-CTF used for online charging only. This function is to monitor the service delivery after the service units are granted and account credit is updated or reserved. This is necessary since it is possible that all granted units are used up and the client wants to continue using service, or the granted units are not used up and service delivery is complete. In both cases, the SD-ABMF will be contacted for further account balance check and credit update/reserve by triggering Request Account Balance and Credit function.

"Unit/Price Rating" Service 1722 implements the SD-RF for online charging only. It is responsible for calculating the required service unit cost and monetary cost for the operations or service requested by the originator. It is used for the online charging only. This service resides in the OMB backbone charging service, so that it could be provided to not only the oneM2M service (i.e., CSF), but also to any third party service which does not have to be compliant with a specific standard body.

"Check Account Balance" service 1726 and "Update/Reserve Credit" Service 1724 implement the functionality of SD-ABMF for online charging only. There are two separate functions:
  Check the account balance/credit to determine if the users/applications has enough credits for using the service.
  Update account balance/credit and Reserve credit for service delivery FIG. 17 shows the following deployment scenarios of service layer charging activity within the OMB system:
  Scenario 1: An application (i.e., AE) configures a new charging event at database in OMB backbone. A CSF in IN-CSE is notified about configuration of the new charging event from data base service when the new charging event is created and configured. The CSF decides to use the new charging event to charge users/applications for using its service, and detects and reports the occurrence of charging event. The backbone charging service (i.e., SD-CDF and SD-CGF) is used for CDR generation. In addition, the CSF in IN-CSE may optionally create and maintain a local copy of the new charging event configuration (i.e., <eventConfig> and <statsCollect>). AE configures charging event via Mca reference point.
  Scenario 2: A service (i.e., CSF) inside the IN-CSE configures the charging event and statistic collection information at backbone database, and relies on SD-CTF in backbone data base to detect and report the occurrence of a charging event for triggering CDR generation. In this scenario, the charging event and stats collect information will be maintained in resource tree (i.e., <eventConfig> and <statsCollect>) in the backbone database.
  Scenario 3: A third party service is provisioned through the service layer platform 1102. The charging event is configured and maintained locally by the third party service, and is opaque to service layer. This implies that any data structure and format could be used to maintain this information. Note, third party service could use its own proprietary methods to implement SD-CTF. Third party service utilizes the SD-CDF and SD-CGF in OMB backbone for CDR and CDR files generation respectively.

Note, the above scenarios are valid for both offline and online charging, and do not include the correlation with underlying network charging system, though the SCEF is shown as the entity to interwork with 3GPP charging system. Since the correlation is out of scope of this disclosure.

The functionality illustrated in FIG. 17, may be implemented in the form of software (i.e., computer-executable instructions) stored in a memory of, and executing on a processor of, a wireless device or other apparatus (e.g., a server, gateway, device, or other computer system), such as one of those illustrated in FIG. 22C or 22D described below. It is also understood that the functionality illustrated in FIG. 17 may implemented as a set of virtualized network functions. The network functions may not necessarily communicate directly, rather, they may communicate via forwarding or routing function.

Figure 18:
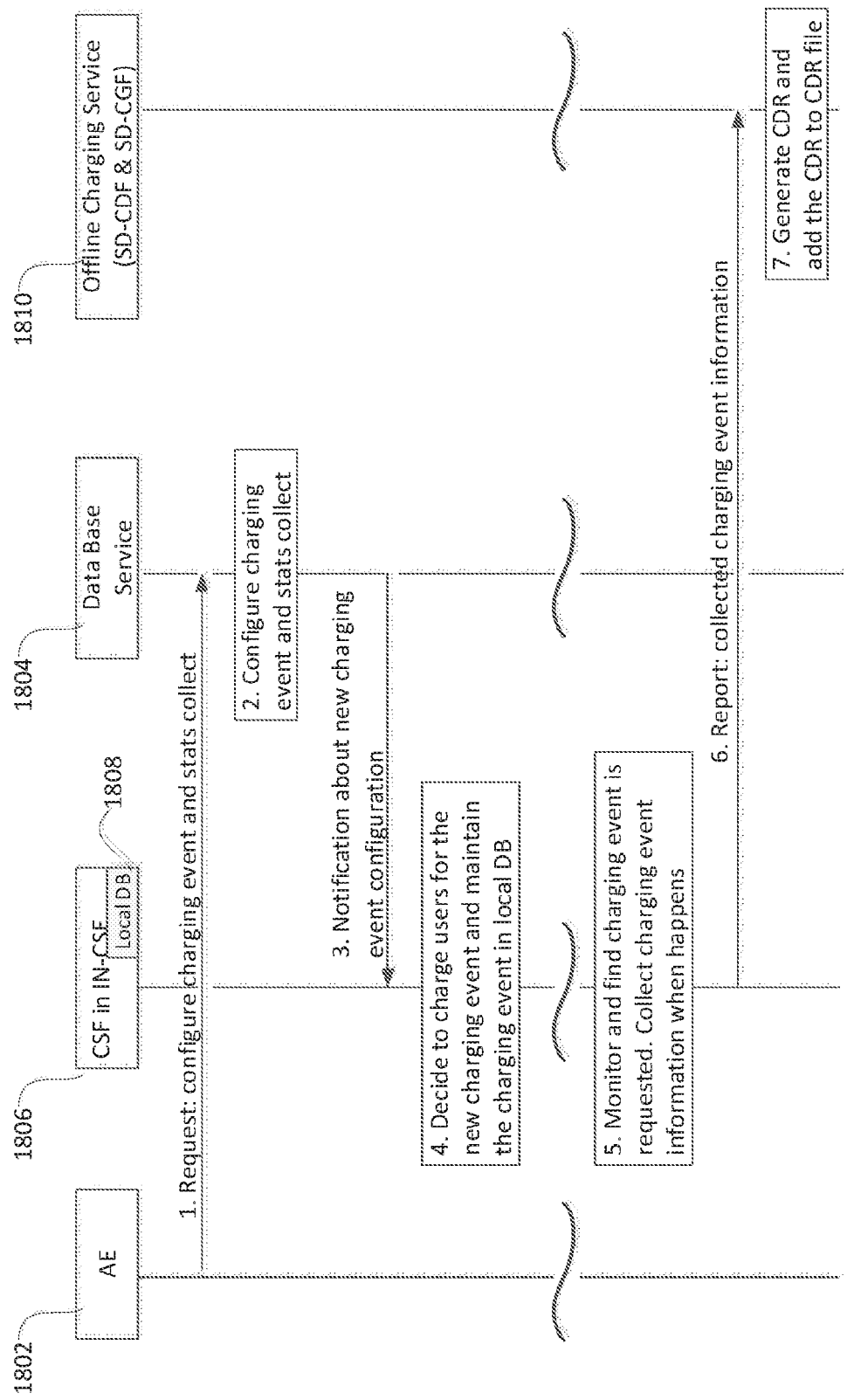
FIG. 18 is a diagram that illustrates an offline charging procedure for a first scenario.

In yet a further embodiment, FIG. 18 shows the offline charging procedure for the deployment scenario 1 with the following steps:

In Step 1 of FIG. 18, AE 1802 sends the request to configure an offline charging event and stats collection information to the data base service 1804, which stays in the OMB backbone. IN-CSE will forward the request as a transit node.

In Step 2 of FIG. 18, Pieces of SD-CTF in the data base service 1804 configure the charging event and stats collection.

In Step 3 of FIG. 18, Data base service 1804 sends notification to the CSF(s) 1806 in IN-CSE about the configuration of a new charging event and stats collection. It is assumed these CSF(s) subscribe to the event of new charging event configuration in advance.

In Step 4 of FIG. 18, each CSF 1806 that is notified would make decision if it wants to apply the newly configured charging event and corresponding stats collection. Assume one CSF decides to apply the charging event, it optionally creates the local copy to store the charging event information and stats collection configuration. The charging event information and stats collection configuration can be stored in local database 1808.

In Step 5 of FIG. 18, SD-CTF in the CSF 1806 keeps monitoring if any requested operation matches the configured charging event, and collects the charging event information when it happens.

In Step 6 of FIG. 18, SD-CTF in the CSF 1806 reports the SD-CDF in the backbone charging service 1810 about the occurrence of the charging event, and corresponding stats information.

In step 7 of FIG. 18, CDR is generated and added to CDR files.

The entities performing the steps illustrated in FIG. 18 may be logical entities that may be implemented in the form of software (i.e., computer-executable instructions) stored in a memory of, and executing on a processor of, an apparatus configured for wireless and/or network communications or a computer system such as those illustrated in FIG. 22C or FIG. 22D. That is, the method(s) illustrated in FIG. 18 may be implemented in the form of software (i.e., computer-executable instructions) stored in a memory of an apparatus, such as the apparatus or computer system illustrated in FIG. 22C or FIG. 22D, which computer executable instructions, when executed by a processor of the apparatus, perform the steps illustrated in FIG. 18. It is also understood that the functionality illustrated in FIG. 18 may implemented as a set of virtualized network functions. The network functions may not necessarily communicate directly, rather, they may communicate via forwarding or routing function. It is also understood that any transmitting and receiving steps illustrated in FIG. 18 may be performed by communication circuitry of the apparatus under control of the processor of the apparatus and the computer-executable instructions (e.g., software) that it executes.

Figure 19:
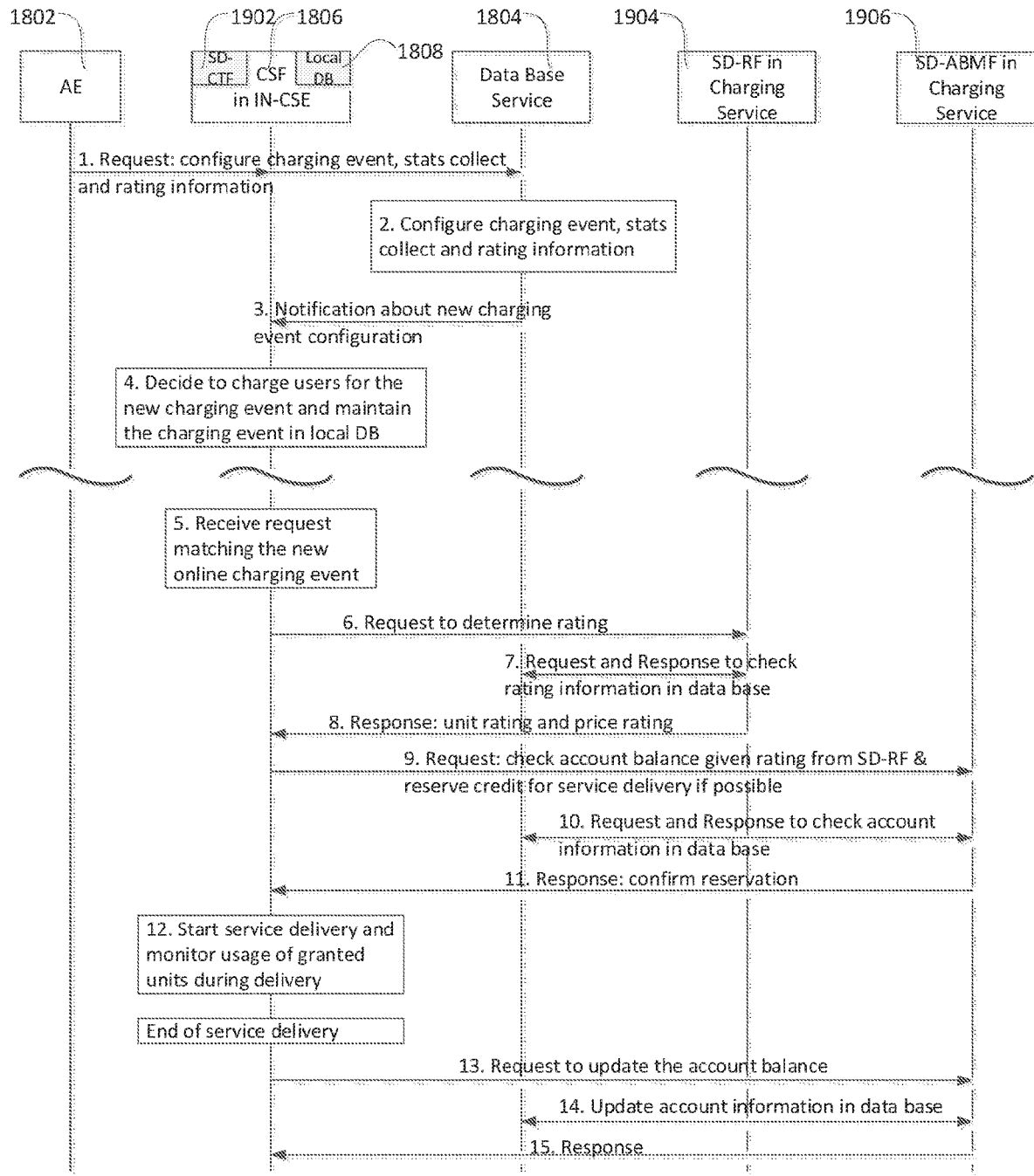
FIG. 19 is a diagram that illustrates an online charging procedure for a first scenario.

In yet even a further embodiment, FIG. 19 shows the online charging procedure for the deployment scenario 1 with the following steps:

In Steps 1 to 4 of FIG. 19, Application (AE) 1802 configures the charging event and stats collection at data base following the same process as steps 1-4 shown in FIG. 18. The exception is that the rating information is configured along with the event information and stats collection information.

In Step 5 of FIG. 19, SD-CTF 1902 keeps monitoring the request until it receives a request that requests the operation configured as the online charging event.

In Steps 6 to 8 of FIG. 19, SD-CTF 1902 in IN-CSE contacts SD-RF 1904 residing in the OMB backbone charging service to calculate the amount of required services units and money cost to provide the service/operation as requested. Such amount is returned to SD-CTF 1902.

In Steps 9 to 11 of FIG. 19, SD-CTF 1902 further contacts the account balance and management function to determine if the requester has sufficient credit in its account to afford the requested operation/service, and ask SD-ABMF 1906 to reserve the credit.

In Step 12 of FIG. 19, SD-CTF 1902 keeps monitoring the usage of granted units to make sure the credits reserved is not used up before operation/service completes.

In Steps 13 to 15 of FIG. 19, SD-CTF 1902 notifies the SD-ABMF 1906 to update the account balance after operation is done or service delivery is completed.

The entities performing the steps illustrated in FIG. 19 may be logical entities that may be implemented in the form of software (i.e., computer-executable instructions) stored in a memory of, and executing on a processor of, an apparatus configured for wireless and/or network communications or a computer system such as those illustrated in FIG. 22C or FIG. 22D. That is, the method(s) illustrated in FIG. 19 may be implemented in the form of software (i.e., computer-executable instructions) stored in a memory of an apparatus, such as the apparatus or computer system illustrated in FIG. 22C or FIG. 22D, which computer executable instructions, when executed by a processor of the apparatus, perform the steps illustrated in FIG. 19. It is also understood that the functionality illustrated in FIG. 19 may implemented as a set of virtualized network functions. The network functions may not necessarily communicate directly, rather, they may communicate via forwarding or routing function. It is also understood that any transmitting and receiving steps illustrated in FIG. 19 may be performed by communication circuitry of the apparatus under control of the processor of the apparatus and the computer-executable instructions (e.g., software) that it executes.

The procedures of offline and online charging for scenarios 2 and 3 are similar to operations of scenario 1. The main difference is the entity that configures the charging event, statistics collection and rating information.

The SGi interface is the "reference point" defined by 3GPP between the EPC, specifically P-GW, and PDN. SGi-LAN refers to the functions deployed by the mobile operators on SGi reference point (i.e., between the two networks). Typical functions may be firewalls, network address translation, deep packet inspection (DPI) nodes, video and TCP optimizers, and content caches. The SGi-LAN is logically and topologically organized into a number of parallel service paths, each providing value to either a particular subscribers subset (e.g., enterprise customers) or a particular traffic type (e.g., video, web).

Figure 20:
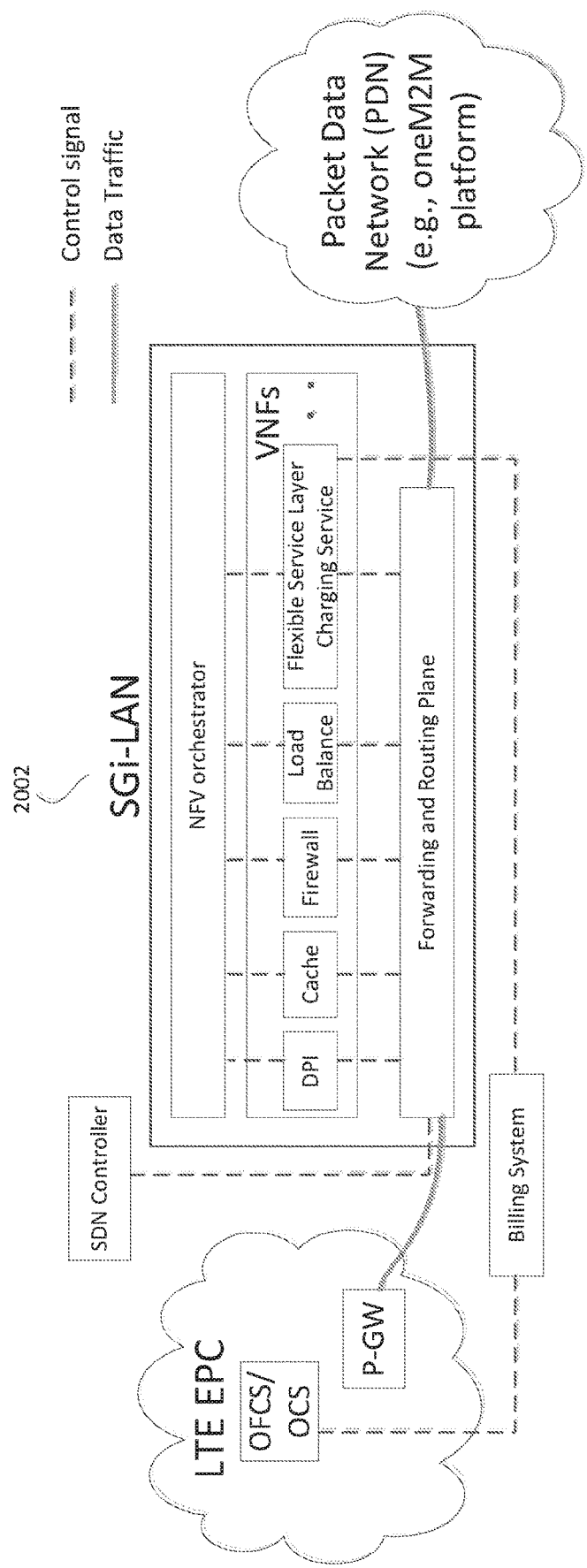
FIG. 20 is a diagram that illustrates an exemplary architecture of SGi-LAN with flexible service layer charging.

In yet even a further embodiment, FIG. 20 shows an exemplary architecture of SGi-LAN 2002 with the flexible service layer charging functionality/service, where the SDN and NFV are integrated.

It is understood that the functionality as exemplary illustrated in the embodiment of FIG. 20 may be implemented in the form of software (i.e., computer-executable instructions) stored in a memory of, and executing on a processor of, a wireless device or other apparatus (e.g., a server, gateway, device, or other computer system), such as one of those illustrated in FIG. 22C or 22D described below. It is also understood that the functionality illustrated in FIG. 20 may implemented as a set of virtualized network functions. The network functions may not necessarily communicate directly, rather, they may communicate via forwarding or routing function.

Figure 21:
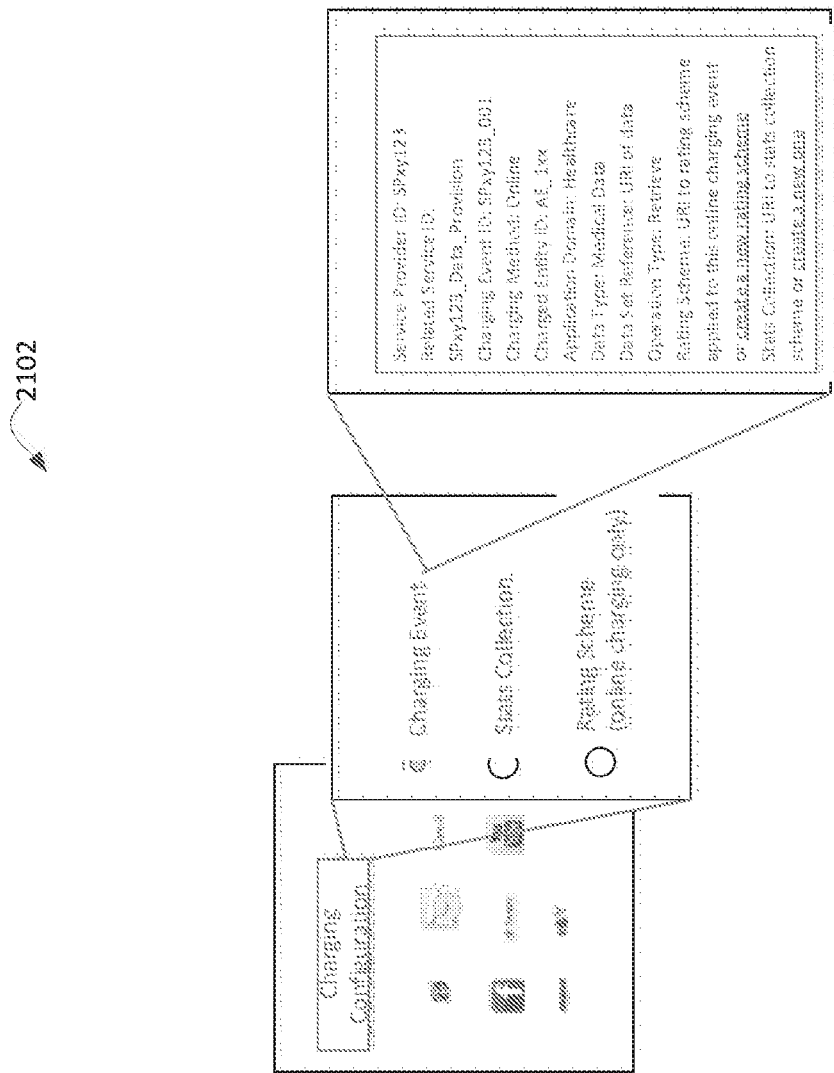
FIG. 21 is a diagram that illustrates an exemplary graphical user interface (GUI) of configuration of service layer charging functionality.

The parameters are defined for enabling the flexible service layer charging in previous sections. A user interface may be implemented for configuring or programming those parameters for charging event, stats collection and rating information. An exemplary user interface 2102 is shown in FIG. 21. The application service provider, service provider and/or network operator could use this interface to configure the charging event and rating scheme for their services at gateway or server. It is to be understood that interface 2102 can be produced using displays such as those shown in FIGS. 22C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs, which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 22A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102.

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 22B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102. The M2M service layer 22 may be implemented by one or more servers, computers, devices, virtual machines (e.g. cloud/storage farms, etc.) or the like, including for example the devices illustrated in FIGS. 22C and 22D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 22B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102 may be hosted within a M2M service layer instance hosted by an M2M node, such as an M2M server, M2M gateway, or M2M device, as shown in FIG. 22B. For example, the logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 22C or FIG. 22D described below.

Further, logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102 can implemented as part of an M2M network that uses a Service Oriented Architecture (SOA) and/or a Resource-Oriented Architecture (ROA) to access services of the present application.

FIG. 22C is a block diagram of an example hardware/software architecture of a M2M network node 30, such as an M2M device 18, an M2M gateway 14, an M2M server, or the like. The node 30 can execute or include logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102. The device 30 can be part of an M2M network as shown in FIG. 22A-B or part of a non-M2M network. As shown in FIG. 22C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers)

and/or radio access-layer (RAN) programs and/or other communications programs. The processor 32 may also perform security operations such as authentication, security key agreement, and/or cryptographic operations, such as at the access-layer and/or application layer for example.

As shown in FIG. 22C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 22C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 22D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 22A and FIG. 22B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 22 A-B or the device 30 of FIG. 22 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as SD-CTF 1202, 1210, 1212, 1504, 1902, SD-CDF 1204, SD-CGF 1206, CSEs 1224, 1222, and 1220, service billing domain 1208, SD-RF 1302, 1904, SD-ABMF 1304, 1604, 1906, applications 1104, 1106, 1108, 1402, 1406, 1502, 1802, service layer platform 1102, M2M Gateway 1408, M2M server 1404, 'Configure Charging Event' service 1702, 'Detect Charging Event' service 1704, 'Report Charging Event' service 1706, 'Generate and Transfer CDRs' Service 1708, 'Process CDR' service 1710, 'Transfer CDR Files' Service 1712, "Configure Rating" Service 1714, 'Identify Online Charging Event' Service, "Request Rating" Service 1716, "Request Account Balance and Credit" Service, "Monitor Service Delivery" Service 1720, "Unit/Price Rating" Service 1722, "Check Account Balance" service 1726, "Update/Reserve Credit" Service 1724, CSF 1806, database service 1804, local database 1808, offline charging service 1810, SGi-LAN 2002 and logical entities to produce interfaces such as GUI 2102 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:

1. An apparatus for service layer online charging on a network comprising:
   a non-transitory memory having instructions stored thereon for service layer online charging of a service layer event; and
   a processor, operably coupled to the non-transitory memory, configured to execute the instructions of:
   receiving, from a service layer charging function of an M2M gateway, a service layer rating request message for the service layer online charging of the service layer event detected by the M2M gateway, where the service layer event is triggered by an application registered to the M2M Gateway and performs a read or write operation on a resource of the M2M Gateway;
   determining a rating scheme to charge for the service layer event;
   calculating an amount of service units to charge for the service layer event based on the rating request message and determined rating scheme; and
   sending, to the service layer charging function of the M2M gateway, a rating response including the calculated amount of service units required for the M2M gateway to process the service layer event,
   wherein the resource is a uniquely addressable element having a Universal Resource Identifier (URI) and is a representation that can be manipulated via RESTful Create, Retrieve, Update, and Delete requests.

2. The apparatus of claim 1, wherein the processor is further configured to execute the instructions of:
   performing charging correlation for the service layer event with the charging system of an underlying network;
   calculating monetary cost based on the required service units, the service layer rating request message and the determined rating scheme; and
   sending, to the service layer charging function of the M2M gateway, the rating response with the calculated monetary cost.

3. The apparatus of claim 1, wherein the service layer rating request message includes details selected from an online charging event name, online charging ID, application ID, requested operation, requested service, quantity of the requested operation, quantity of the requested service and combinations thereof.

4. The apparatus of claim 1, further comprising:
   a rating function operably coupled to the non-transitory memory and processor, the rating function configured to use information including charging event information, application identification and requested operation to calculate an indicated amount of service units and monetary cost.

5. The apparatus of claim 4, further comprising an account balance and management function configured to receive an account credit check message from the service layer charging function of the M2M gateway.

6. The apparatus of claim 5, wherein the account credit check message includes information selected from a required amount of service units used by the rating function, a require calculated cost by the rating function, application ID, application external ID, service provider ID, service layer platform operator ID, and combinations thereof.

7. The apparatus of claim 5, wherein the account balance and management function is configured to execute the instructions of:
   receive, from the service layer charging function of the M2M gateway, a credit reservation request to reserve credit before starting service delivery; and
   reserving the credit for the service delivery.

8. The apparatus of claim 7, wherein the account balance and management function is configured execute the instructions of:
   receiving, from the service layer charging function of the M2M gateway, a request to repeat the determining and calculating steps based upon depleted, granted service units.

9. The apparatus of claim 1, wherein the processor is further configured to execute the instructions of:
   receiving, from an application, a configure rating request to configure the rating scheme used to charge for the service layer event.

10. The apparatus of claim 9, wherein the configure rating request includes parameters selected from a reference to a service layer online charging event, a list of applications to which a rating scheme is applied, a service layer online charging scenario, service unit measurement, cost per service unit and combinations thereof.

11. The apparatus of claim 9, wherein the rating scheme to charge for the service layer event varies among one or more applications.

12. An apparatus operating on a network comprising:
    a non-transitory memory having instructions stored thereon for configuring rating information; and
    a processor, operably coupled to the non-transitory memory, configured to execute the instructions of:
    receiving, from an originator, a configure rating request message including service layer rating information;
    storing, at a service layer charging function of an M2M server, the service layer rating information received from the originator;
    configuring, at the service layer charging function in the M2M server, the service layer rating information; and
    sending, from the service layer charging function of the M2M server, a response including the configured service layer rating information to the originator,
    wherein a service layer event is triggered by an application registered to the M2M server and performs a read or write operation on a resource of the M2M server,
    wherein the resource is a uniquely addressable element having a Universal Resource Identifier (URI) and is a representation that can be manipulated via RESTful Create, Retrieve, Update, and Delete requests.

13. The apparatus of claim 12, wherein the service layer rating information is selected from reference to a service layer online charging event, list of applications for applying a rating scheme, service layer online charging scenario, service unit measurement, cost per service unit and combinations thereof.

14. The apparatus of claim 12, wherein the service layer rating information is used for a defined service layer online charging event.

15. The apparatus of claim 12, wherein the configure rating request message includes a service layer charging event ID.

16. The apparatus of claim 12, wherein the configure rating request message includes a resource type attribute and an application type attribute associated with the a service layer online charging event.

17. The apparatus of claim 12, where the configure rating request message includes a location Restriction attribute providing a location and area of a captured event.

18. A method of service layer online charging of a service layer event in a network comprising:
    receiving, at a service layer charging function of an M2M server, a service layer rating request message for the service layer online charging of the service layer event in the network, where the service layer event is triggered by an application registered to the M2M Gateway and performs a read or write operation on a resource of the M2M Gateway:
    determining, at a service domain rating function in the M2M server, a rating scheme for charging the service layer event; and
    calculating, at the service domain rating function in the M2M server, an amount of service units based on the service layer rating request message and determined rating scheme,
    wherein the resource is a uniquely addressable element having a Universal Resource Identifier (URI) and is a representation that can be manipulated via RESTful Create, Retrieve, Update, and Delete requests.

19. The method of claim 18, further comprising:
    performing charging correlation for the service layer event with the charging system of an underlying network; and
    sending, to the service layer charging function of an M2M gateway, a rating response based upon the calculated amount of service units.

20. The method of claim 18, further comprising:
    calculating monetary cost based on the service layer rating request message and determined rating scheme.

* * * * *